(12) United States Patent
Sekiguchi et al.

(10) Patent No.: US 11,015,668 B2
(45) Date of Patent: May 25, 2021

(54) PAD CLIP, ASSEMBLY OF PAD CLIP AND RETURN SPRING, AND FLOATING TYPE DISC BRAKE

(71) Applicant: AKEBONO BRAKE INDUSTRY CO., LTD., Tokyo (JP)

(72) Inventors: Akihiko Sekiguchi, Tokyo (JP); Yuta Minoshima, Tokyo (JP); Daisuke Kobayashi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 19 days.

(21) Appl. No.: 16/224,849

(22) Filed: Dec. 19, 2018

(65) Prior Publication Data

US 2019/0203788 A1 Jul. 4, 2019

(30) Foreign Application Priority Data

Dec. 28, 2017 (JP) .............................. JP2017-254212

(51) Int. Cl.
*F16D 65/097* (2006.01)
*F16D 55/226* (2006.01)
(Continued)

(52) U.S. Cl.
CPC ....... *F16D 65/0975* (2013.01); *F16D 55/226* (2013.01); *F16D 55/227* (2013.01);
(Continued)

(58) Field of Classification Search
CPC ............. F16D 65/0979; F16D 65/0978; F16D 65/0977; F16D 65/0975; F16D 65/0974;
(Continued)

(56) References Cited

U.S. PATENT DOCUMENTS

| 5,249,647 A | 10/1993 | Kobayashi et al. |
| 2006/0070828 A1* | 4/2006 | Hendrich ............ F16D 65/0972 188/73.31 |

(Continued)

FOREIGN PATENT DOCUMENTS

| CN | 102032296 A | 4/2011 |
| EP | A1-2557330 | 2/2013 |

(Continued)

OTHER PUBLICATIONS

Extended European Search Report dated May 2, 2019 in corresponding European patent application 18215205.8 (9 pages).

(Continued)

*Primary Examiner* — Bradley T King
*Assistant Examiner* — Stephen M Bowes
(74) *Attorney, Agent, or Firm* — Faegre Drinker Biddle & Reath LLP

(57) ABSTRACT

A pad clip for a disc brake includes: a radial pressing portion which is disposed at inward than a clamping portion in a radial direction and presses outward in the radial direction an ear portion; a circumferential pressing portion which extends outward in the radial direction from a radially outer side portion of the clamping portion, an intermediate portion thereof being folded back inward in radial and circumferential directions of the rotor, and a tip end portion thereof pressing the pad inward in the circumferential direction; and a spring holding portion which protrudes outward in the circumferential direction from the radially outer side portion of the clamping portion than a base portion of the circumferential pressing portion, and holds a return spring which is made of wire material and presses the pad away from the rotor in an axial direction of the rotor.

14 Claims, 21 Drawing Sheets

(51) Int. Cl.
*F16D 55/227* (2006.01)
*F16D 65/12* (2006.01)
*F16D 55/00* (2006.01)

(52) U.S. Cl.
CPC ..... *F16D 65/0972* (2013.01); *F16D 65/0976* (2013.01); *F16D 65/122* (2013.01); *F16D 2055/0041* (2013.01)

(58) Field of Classification Search
CPC ............. F16D 65/0973; F16D 65/0972; F16D 65/097; F16D 55/228; F16D 2127/02; F16D 2055/0029; F16D 65/0976
See application file for complete search history.

(56) References Cited

U.S. PATENT DOCUMENTS

| 2006/0260884 | A1* | 11/2006 | Hayashi | F16D 65/0972 188/71.1 |
| 2010/0243389 | A1* | 9/2010 | Miura | F16D 65/0972 188/206 R |
| 2011/0168503 | A1* | 7/2011 | Chelaidite | F16D 65/0972 188/73.31 |
| 2012/0186918 | A1 | 7/2012 | Wakabayashi et al. | |
| 2013/0025981 | A1* | 1/2013 | Maehara | F16D 65/0978 188/72.3 |
| 2014/0305754 | A1* | 10/2014 | Bernard | F16D 65/0978 188/250 E |
| 2014/0326548 | A1* | 11/2014 | Merrien | F16D 65/0978 188/73.38 |
| 2014/0374202 | A1* | 12/2014 | Mahoudeaux | F16D 65/0972 188/250 E |
| 2019/0085921 | A1* | 3/2019 | Reuss | F16D 55/2262 |

FOREIGN PATENT DOCUMENTS

| JP | H05-36141 U | 5/1993 |
| JP | A-2010-203559 | 9/2010 |
| JP | 2016-156481 A | 9/2016 |

OTHER PUBLICATIONS

First Office Action dated Jun. 18, 2020 in Chinese Patent Application No. 201811620408.3 (7 pages) with an English translation (8 pages).

* cited by examiner

FIG. 20 --Prior Art--

--Prior Art--

PAD CLIP, ASSEMBLY OF PAD CLIP AND RETURN SPRING, AND FLOATING TYPE DISC BRAKE

CROSS REFERENCE TO RELATED APPLICATIONS

This application is based on Japanese Patent Application (No. 2017-254212) filed on Dec. 28, 2017, the contents of which are incorporated herein by way of reference.

BACKGROUND

The present invention relates to a pad clip which is used for smoothly sliding a pad with respect to a support configuring a floating type disc brake to prevent rattling of the pad, and a floating type disc brake including the pad clip.

FIGS. 19 to 21 show a floating type disc brake with a conventional structure described in JP H5-36141 U. A floating type disc brake 1 includes a support 2, a caliper 3, an inner pad 4, an outer pad 5, a pair of pad clips 6, and a pair of return springs 7. The floating type disc brake 1 performs braking such that the caliper 3 supported by the support 2 is displaced in an axial direction and a rotor 8 which rotates together with a vehicle wheel (not shown) is clamped from both axial sides thereof by the inner and the outer pads 4, 5.

In the specification and all claims, unless otherwise stated, "an axial direction", "a radial direction" and "a circumferential direction" refer to an axial direction, a radial direction and a circumferential direction of a rotor. With respect to each part configuring the floating type disc brake, an axially inner side refers to a central side in a vehicle width direction and an axially outer side refers to an outer side in a vehicle width direction. Further, a circumferentially inner side refers to a circumferentially central side of the floating type disc brake in an assembled state, and a circumferentially outer side refers to both circumferential sides of the floating type disc brake in an assembled state.

The support 2 is fixed to a suspension device such as a knuckle configuring a vehicle body. A pair of rotation-in side and rotation-out side support portions 9a, 9b each of which straddles the rotor 8 is provided on both circumferentially outer side portions of the support 2. The rotation-in side support portions 9a includes a rotor pass portion 10a at a radially outer side portion thereof and a pair of pad guide portions 11a, and the rotation-out side support portion 9b includes a rotor pass portion 10b at a radially outer side portion thereof and a pair of pad guide portions 11b. The rotor pass portions 10a, 10b are provided to extend in the axial direction, and the pad guide portions 11a, 11b are provided to extend respectively radially inward from both axial end portions of the rotor pass portions 10a, 10b.

The inner pad 4 is axially movably supported between the pad guide portion 11a on the axially inner side of the rotation-in side support portion 9a and the pad guide portion 11b on the axially inner side of the rotation-out side support portion 9b. For this purpose, a pair of ear portions 12 provided on both circumferentially outer side portions of the inner pad 4 is concave-convex engaged with recessed portions 13a, 13b provided on the pad guide portions 11a, 11b which are respectively on the axially inner side of the rotation-in side and rotation-out side support portions 9a, 9b. Further, the outer pad 5 is axially movably supported between the pad guide portion 11a on the axially outer side of the rotation-in side support portion 9a and the pad guide portion 11b on the axially outer side of the rotation-out side support portion 9b. For this purpose, a pair of ear portions 14 provided on both circumferentially outer side portions of the outer pad 5 is concave-convex engaged with recessed portions 15a, 15b provided on the pad guide portions 11a, 11b which are respectively on the axially outer side of the rotation-in side and rotation-out side support portions 9a, 9b.

The pair of pad clips 6 is respectively provided between circumferentially inner side surfaces of the rotation-in side and rotation-out side support portions 9a, 9b and circumferentially outer side portions of the inner and outer pads 4, 5. The pad clip 6 is made of metal plate, is configured in a substantially U-shaped (gate shape), and includes a connecting portion 16 extending in the axial direction along the rotor pass portions 10a, 10b and a pair of leg portions 17 respectively extending radially inward from both axial end portions of the connecting portion 16. The pair of leg portions 17 is respectively arranged between the circumferential inner side surfaces of the pad guide portions 11a, 11b and the circumferential outer portions of the inner and outer pads 4, 5. Thus, the inner and outer pads 4, 5 are prevented from directly rubbing against the pad guide portions 11a, 11b, and smooth sliding of the inner and the outer pads 4, 5 is secured. Further, as described in JP-A-2016-156481, etc., in order to prevent rattling of the pad, a pressing portion configured to apply an urging force to the pad is also provided on a part of the pad clip.

The pair of return springs 7 respectively applies elastic forces to both circumferentially outer side portions of the inner and outer pads 4, 5 in a direction away from the rotor 8. The return spring 7 is made of metal wire material and is configured in a substantially M shape, and includes a coil portion 18 at a center portion thereof. Further, the coil portion 18 is locked to a hook piece 19 provided on the connecting portion 16 configuring the pad clip 6, and thus the return spring 7 is held on the pad clip 6. In this state, both end portions of the return spring 7 are locked with the radially outer side portions of the inner and outer pads 4, 5. As a result, an elastic force in a direction away from the rotor 8 is applied to the inner and outer pads 4, 5, so that friction surfaces of the inner and outer pads 4, 5 are separated from the rotor 8 when the brake is released.

The caliper 3 is arranged to straddle the inner and outer pads 4, 5 supported by the support 2 as described above. The caliper 3 includes a cylinder portion 20, in which a piston is fitted, in the axially inner side portion thereof, and a pawl portion 21 in the axially outer side portion thereof. A pair of guide pins 22 fixed to both circumferentially outer side portions is slidably inserted into guide holes (not shown) formed in the rotation-in side and rotation-out side support portions 9a, 9b, and thus the caliper 3 is supported to be movable in the axial direction with respect to the support 2.

In braking, an interior of the cylinder portion 20 is pressurized, and the inner pad 4 is pressed against an axially inner side surface of the rotor 8 from an upper side to a lower side in FIG. 19 by the piston. Accordingly, as a reaction of the pressing force, the caliper 3 is displaced upward in FIG. 19 based on the sliding of the guide pin 22 and the guide hole, and the pawl portion 21 presses the outer pad 5 to the axially outer side surface of the rotor 8. As a result, the rotor 8 is strongly clamped from both axial sides thereof by the inner and outer pads 4, 5 so as to perform braking.

Patent Document 1: JP H5-36141 U
Patent Document 2: JP 2016-156481 A

SUMMARY

A pad clip of the present invention is made of metal plate and is provided between a circumferentially inner side surface of a pad guide portion, which is arranged on an axial side of a rotor, and an circumferentially outer side portion of a pad, at a circumferentially outer side portion on a rotation-in side (anti-anchor side) of a support configuring a floating type disc brake.

The pad clip of the present invention includes:

a clamping portion which has a substantially U-shaped cross section and is configured to elastically clamp a projection portion provided on the circumferentially inner side surface of a pad guide portion of a support from both sides thereof in a radial direction of a rotor;

a radial pressing portion which is disposed at inward than the clamping portion in the radial direction and is configured to press outward in the radial direction an ear portion provided on a circumferentially outer side portion of the pad;

a circumferential pressing portion which extends outward in the radial direction from a radially outer side portion of the clamping portion, an intermediate portion thereof being folded back inward in a circumferential direction of the rotor and being folded back inward in the radial direction, and a tip end portion thereof being configured to press the pad inward in the circumferential direction at a vicinity of the clamping portion in the radial direction; and a spring holding portion which protrudes outward in the circumferential direction from the radially outer side portion of the clamping portion than a base portion of the circumferential pressing portion, and is configured to hold a return spring which is made of wire material and presses the pad away from the rotor in an axial direction of the rotor.

In the pad clip of the present invention, for example, an engaging portion configured to engage an end portion of the return spring may be provided in the base portion of the circumferential pressing portion.

In this case, the engaging portion may be a through hole or a cutout.

Further, the engaging portion may be a triangular through hole.

In the pad clip of the present invention, for example, a restraining portion which is configured to support an elastic force of the return spring in a state before the pad is assembled and restrain the return spring with respect to the pad clip can be provided outward in the radial direction than the clamping portion and on an axial side of the base portion of the circumferential pressing portion. Thus, the return spring can be preset on the pad clip.

In the pad clip of the present invention, for example, the circumferential pressing portion includes a pair of pressing arms and a pad abutting portion, the pressing arms extend from a base end portion to an intermediate portion of the circumferential pressing portion, each of the pressing arms has an inverted U-shape, the pressing arms are spaced apart from each other in an axial direction of the rotor, and the pad abutting portion is provided at the tip end portion of the circumferential pressing portion and connects the pair of pressing arms to each other in the axial direction.

In this case, width dimensions of the pair of pressing arms in the axial direction can be the same.

The pad clip of the present invention further includes a plate-shaped guide plate portion which extends inward in the radial direction from a radially inner side portion of the clamping portion and is configured to be arranged between a tip end surface of the ear portion and the circumferentially inner side surface of the pad guide portion, wherein the guide plate portion is positioned outward in the circumferential direction than the base portion of the circumferential pressing portion.

An assembly of a pad clip and a return spring of the present invention includes the pad clip of the present invention and a return spring made of wire material. A part of the return spring is held by the spring holding portion and the return spring is held on the pad clip in a state of being arranged outward in the circumferential direction than the base portion of the circumferential pressing portion.

In the assembly of a pad clip and a return spring of the present invention, it is sufficient that the return spring is held on the pad clip, and the return spring may be held (preset) in a state before the pad clip is attached to the support or may be held after the pad clip is attached to the support.

In the assembly of a pad clip and a return spring of the present invention, for example, the return spring may include a coil portion, and the coil portion can be held by the spring holding portion in a state where a central axis of the coil portion is oriented in the circumferential direction.

In the assembly of a pad clip and a return spring of the present invention, for example, the return spring may include a spring arm which is arranged between the clamping portion and the radial pressing portion in the radial portion and extends toward the rotor side in the axial direction, and a tip end portion of the spring arm is bent inward in the circumferential direction.

In the assembly of a pad clip and a return spring of the present invention, for example, an engaging portion which is a triangular through hole can be provided in the base portion of the circumferential pressing portion, and an end portion of the return spring can be pressed to a part (preferably a corner portion) of an opening edge of the engaging portion based on an elastic restoring force of the return spring.

A floating type disc brake of the present invention includes a support, a pair of pads, a caliper, pad clips, and return springs.

The support is fixed to a vehicle body so as to be adjacent to a rotor rotating together with a vehicle wheel.

The pair of pads is supported to be movable in an axial direction of the rotor with respect to the support in a state of being arranged on both axial sides of the rotor.

The caliper is supported to be movable in the axial direction with respect to the support.

The pad clips are respectively provided between a circumferentially inner side surface of a pad guide portion of a circumferentially outer side portion of the support and a circumferentially outer side portion of each pad, the pad guide portion being arranged on an axial side of the rotor.

The return springs are respectively held on each of the pad clips and configured to press each pad away from the rotor in an axial direction of the rotor.

Further, in the floating type disc brake of the present invention, at least one pair of the pad clip and the return spring is the assembly of a pad clip and a return spring of the present invention.

BRIEF DESCRIPTION OF THE DRAWINGS

FIGS. 11A and 11B are perspective views showing the pad clip to be arranged on the rotation-in side and the axially inner side in a taken out state, wherein FIG. 11A is a view as seen from a circumferentially inner side, and FIG. 11B is a view as seen from a circumferentially outer side.

FIGS. 12A and 12B are perspective views showing a pad clip to be arranged on the rotation-out side and the axially inner side in a taken out state, wherein FIG. 12A is a view as seen from the circumferentially inner side, and FIG. 12B is a view as seen from the circumferentially outer side.

FIGS. 17A and 17B are perspective views showing the assembly of a pad clip and a return spring which is to be arranged on the rotation-in side and the axially inner side, wherein FIG. 17A is a view as seen from the circumferentially inner side, and FIG. 17B is a view as seen from the circumferentially outer side.

FIGS. 18A and 18B are perspective views showing the assembly of a pad clip and a return spring which is to be arranged on the rotation-out side and the axially inner side, wherein FIG. 18A is a view as seen from the circumferentially inner side, and FIG. 18B is a view as seen from the circumferentially outer side.

DETAILED DESCRIPTION OF EXEMPLIFIED EMBODIMENTS

Figure 1:
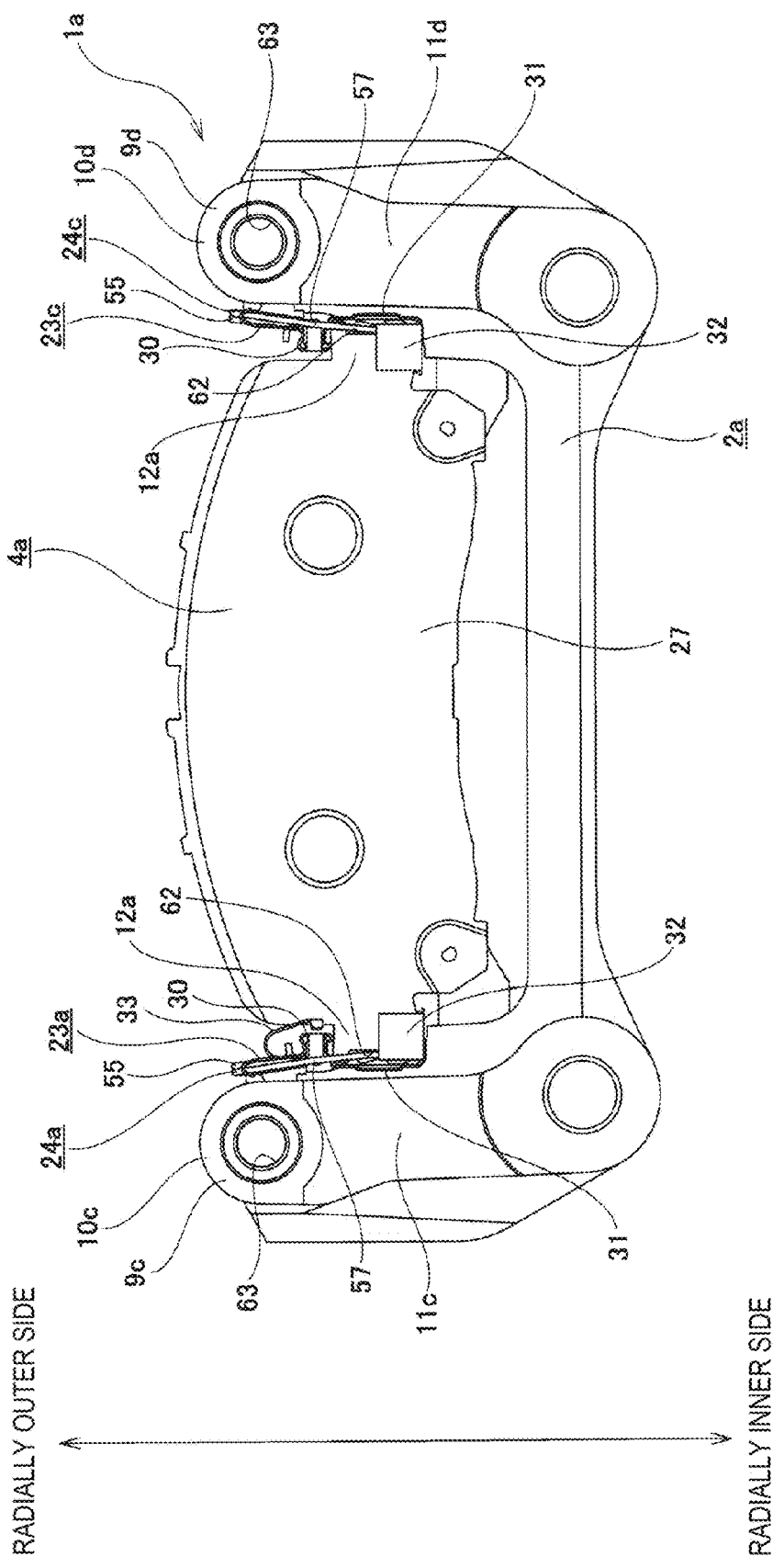
FIG. 1 is a view of a floating type disc brake according to one embodiment as seen from an axially inner side in a state where a caliper is omitted.

In the floating type disc brake with a conventional structure, one pad clip 6 is arranged on each of the rotation-in side and the rotation-out side thereof. Therefore, as described above, the pad clip 6 is configured by the pair of leg portions 17 arranged on both axial sides of the rotor 8 and the connecting portion 16 connecting the two leg portions 17 in the axial direction.

Here, a thickness dimension of the rotor 8 arranged between the pair of leg portions 17 varies according to not only types of vehicle but also brake sizes. Therefore, in the conventional structure, it is necessary to design and manufacture a new pad clip 6 including a connecting portion 16 of different lengths according to the thickness dimension of the rotor 8. Therefore, manufacturing costs of the pad clip 6, and hence the floating type disc brake 1 is increased.

In view of such circumstances, it is considered to use separate pad clips on the axially inner side and the axially outer side. According to such a configuration, since the pad clip on the axially inner side and the pad clip on the axially outer side are not connected in the axial direction, it is not necessary to design and manufacture a new pad clip according to the thickness dimension of the rotor. Therefore, commonality of the pad clip can be realized to reduce the manufacturing costs.

However, in a case where the pad clips which are separated from each other are used on the axially inner side and the axially outer side, the hook piece 19 configured to lock the return spring 7 cannot be provided as the pad clip 6 with the conventional structure described above. Therefore, the pad clip is required to have a structure capable of holding the return spring without impairing the function thereof.

The present invention has been made in view of the above problems, and an object thereof is to realize a structure capable of holding the return spring without impairing the function of the pad clips on the premise that the pad clips which are separated from each other are used on the axially inner side and the axially outer side of the rotor.

One Embodiment

One embodiment will be described with reference to FIGS. 1 to 18.

A floating type disc brake 1a of the present embodiment includes a support 2a, a caliper (not shown), an inner pad 4a, an outer pad 5a, four pad clips 23a to 23d, and four return springs 24a to 24d. During braking, the caliper supported by the support 2a is displaced in an axial direction and thus a rotor 8, which rotates together with a vehicle wheel (not shown), is clamped from both axial sides thereof by the inner and the outer pads 4, 5.

The support 2a is fixed to a suspension device such as a knuckle configuring a vehicle body in a state of being adjacent to an axially inner side of the rotor 8. A pair of rotation-in side and rotation-out side support portions 9c, 9d which straddles the rotor 8 are provided on both circumferentially outer side portions of the support 2a. The rotation-in side support portions 9c includes a rotor pass portion 10c at a radially outer side portion thereof and a pair of pad guide portions 11c, and the rotation-out side support portion 9d includes a rotor pass portion 10d at a radially outer side portion thereof and a pair of pad guide portions 11d. The rotor pass portions 10c, 10d are provided to extend in the axial direction of the rotor 8, and the pad guide portions 11c, 11d are provided to extend respectively inward in the radial direction of the rotor 8 from both axial end portions of the rotor pass portions 10c, 10d.

Recessed portions 13c, 15c which have a substantially U-shaped cross section and are recessed outward in the circumferential direction of the rotor 8 are provided on radially inner side portions and on circumferentially inner side surface of the pair of pad guide portions 11c provided on the rotation-in side support portion 9c, and projection portions 25 which have a substantially rectangular cross section and project inward in the circumferential direction are provided on portions adjacent to radially outer side of the recessed portions 13c, 15c. Further, recessed portions 13d, 15d which have a substantially U-shaped cross section and are recessed outward in the circumferential direction are provided on radially inner side portions and on circumferentially inner side surface of the pair of pad guide portions 11d provided on the rotation-out side support portion 9d, and projection portion 25 which have a rectangular cross section and project inward in the circumferential direction are provided on portions adjacent to radially outer side of the recessed portions 13d, 15d.

The inner pad 4a includes a lining 26 and a pressure plate 27 supported on a back surface (axially inner side surface) of the lining 26 and is axially movably supported between the pad guide portion 11c on the axially inner side of the rotation-in side support portion 9c and the pad guide portion 11d on the axially inner side of the rotation-out side support portion 9d. For this purpose, a pair of ear portions 12a which has a substantially rectangular plate shape and is provided on both circumferentially outer side portions of the pressure plate 27 is concave-convex engaged with the recessed portions 13c, 13d provided on the pad guide portions 11c, 11d which are respectively on the axially inner side of the rotation-in side and rotation-out side support portions 9c, 9d.

The outer pad 5a includes a lining 28 and a pressure plate 29 supported on a back surface (axially outer side surface) of the lining 28 and is axially movably supported between the pad guide portion 11c on the axially outer side of the rotation-in side support portion 9c and the pad guide portion 11d on the axially outer side of the rotation-out side support portion 9d. For this purpose, a pair of ear portions 14a which has a substantially rectangular plate shape and is provided on both circumferentially outer side portions of the pressure plate 29 is concave-convex engaged with the recessed portions 15c, 15d provided on the pad guide portions 11c, 11d which are respectively on the axially outer side of the rotation-in side and rotation-out side support portions 9c, 9d.

In the present embodiment, the pad clip 23a is interposed between the circumferentially inner side surface of the pad guide portion 11c which is on the axially inner side and configures the rotation-in side support portion 9c and the circumferentially outer side surface of the inner pad 4a, and the pad clip 23b which is separate from the pad clip 23a is interposed between the circumferentially inner side surface of the pad guide portion 11c which is on the axially outer side and configures the rotation-in side support portion 9c and the circumferentially outer side surface of the outer pad 5a. Further, the pad clip 23a is interposed between the circumferentially inner side surface of the pad guide portion 11d which is on the axially inner side and configures the rotation-in side support portion 9d and the circumferentially outer side surface of the inner pad 4a, and the pad clip 23b which is separate from the pad clip 23a is interposed between the circumferentially inner side surface of the pad guide portion 11d which is on the axially outer side and configures the rotation-in side support portion 9d and the circumferentially outer side surface of the outer pad 5a. The pair of pad clips 23a, 23b arranged on the rotation-in side (anti-anchor side) corresponds to the pad clip of the present invention.

In the present embodiment, four pad clips 23a to 23d are used, but the pair of pad clips 23a, 23b arranged on the rotation-in side and the pair of pad clips 23c, 23d arranged on the rotation-out side (anchor side) are respectively symmetrical with each other relative to the axial direction. Therefore, as for detailed description of the pad clips 23a to 23d, the pad clips 23a, 23c arranged on the axially inner side will be describe as an example, and detailed description of the pad clips 23b, 23d arranged on the axially outer side will be omitted.

As shown in FIGS. 8 to 11, the pad clip 23a arranged on the rotation-in side is manufactured by pressing a metal plate having elasticity and corrosion resistance such as a stainless steel plate, and includes a clamping portion 30, a guide plate portion 31, an radial pressing portion 32, a circumferential pressing portion 33, a spring holding portion 34, and a restraining portion 35.

The clamping portion 30 has a substantially U-shaped cross section and is provided at a radially outward portion of the pad clip 23a. In the clamping portion 30, the projection portion 25 provided on the circumferentially inner side surface of the pad guide portion 11c is clamped elastically from both radially outer sides thereof by an outer side plate portion 36 provided on a radially outer side portion of the clamping portion 30 and an inner side plate portion 37 provided on a radially inner side portion of the clamping portion 30, and positioning of the pad clip 23a in the radial direction is realized. Circumferentially inner end portions of the outer side plate portion 36 and the inner side plate portion 37 are connected in the radial direction by a connecting plate portion 38 which extends in the radial direction and is arranged on a circumferentially inner side of the projection portion 25. A pair of first pawl piece 39a and a second pawl piece 39b which is bent outward in the circumferential direction is provided on both axial end portions of the connecting plate portion 38. The first pawl piece 39a and the second claw piece 39b elastically clamp the projection portion 25 from both axial sides thereof, and positioning of the pad clip 23a in the axial direction is realized.

The guide plate portion 31 is configured in a plate shape and is provided at a radially inward portion of the pad clip 23a. The guide plate portion 31 extends radially inward so as to be bent at a substantial right angle from the circumferentially outer end portion of the inner side plate portion 37 configuring the clamping portion 30. The guide plate portion 31 is arranged to be substantially parallel to the connecting plate portion 38 configuring the clamping portion 30, and is arranged along a bottom surface (circumferentially inner side surface) of the recessed portion 13c of the pad guide portion 11c. Further, the guide plate portion 31 is arranged (clamped) between the bottom surface of the recessed portion 13c of the pad guide portion 11c and a tip end surface (circumferentially outer side surface) of the ear portion 12a of the inner pad 4a.

The radial pressing portion 32 is formed in a transverse V shape and is provided at a radially inner end portion of the pad clip 23a. The radial pressing portion 32 includes a plated-shaped pressing base plate portion 40 which is bent from the radially inner end portion of the guide plate portion 31 inward in the circumferential direction at a substantial right angle, a tubular return portion 41 which is folded back 180 degrees from an axially inner end portion of the pressing base plate portion 40 toward the radially outer side and the axially outer side (toward the rotor 8), and a plate-shaped pressing body portion 42 which extends from the return portion 41 in a direction toward the radially outer side and toward the axially outer side.

The pressing base plate portion 40 and the inner side plate portion 37 configuring the clamping portion 30 are arranged substantially in parallel to each other. Therefore, the pressing base plate portion 40, the inner side plate portion 37 and the guide plate portion 31 which connects circumferentially outer side portion of the pressing base plate portion 40 and the inner side plate portion 37 in the radial direction are configured substantially in a U-shape, and are arranged without backlash on an inner side of the recessed portion 13c formed on the circumferentially inner side surface of the pad guide portion 11c. When the ear portion 12a configuring the inner pad 4a is concave-convex engaged with the inner side of the recessed portion 13c, the pressing body portion 42 is arranged on the radially inner side of the ear portion 12a. Further, the ear portion 12a is pressed outward in the radial direction based on bending deformation of the return portion 41. A cutout 43 is formed over the entire length on the circumferentially outer side portion of the pressing body portion 42 as described above. Thus, contact between the pressing body portion 42 and the guide plate portion 31 is prevented.

The circumferential pressing portion 33 is configured in an inverted U-shape, and is provided at a radially outward portion of the pad clip 23a. The circumferential pressing portion 33 includes a pair of pressing arms 44 each of which has an inverted U-shape and is spaced apart from each other in the axial direction, and a pad abutting portion 45 which connects tip end portions of the pair of pressing arms 44 in the axial direction. The pressing arms 44 are provided at a base end portion and an intermediate portion of the circumferential pressing portion 33 and extend outward in the radial direction from a circumferentially outer end portion of the outer side plate portion 36 configuring the clamping portion 30. An intermediate portion of each of the pressing arms 44 is folded back inward in the circumferential direction and is folded back inward in the radial direction. Width dimensions of the pair of pressing arms 44 in the axial direction are the same. The pad abutting portion 45 is provided at the tip end portion of the circumferential pressing portion 33, and is arranged in the vicinity of the clamping portion 30 in the radial direction, that is, on the circumferentially inner side of the connecting plate portion 38. Due to the bending deformation of the pair of pressing arms 44, the circumferential pressing portion 33 elastically presses the circumferentially outer side surface of the radially outer side portion (a portion radially outward than the ear portion 12a) of the inner pad 4a inward in the circumferential direction (toward the rotation-out side) by the pad abutting portion 45. A base portion of the pair of pressing arms 44 is arranged circumferentially inward than the guide plate portion 31. Thus, as to be described later, an installation space of the coil portion 55 configuring the return spring 24a can be ensured, and a part of a spring arm 57 extending from the coil portion 55 is easily guided into an inner side of the guide plate portion 31 in the circumferential direction.

When the amount of bending deformation of the pair of pressing arms 44 increases, the pad abutting portion 45 abuts with the connecting plate portion 38, and thus a spring constant of the circumferential pressing portion 33 can have a two-step characteristic. Specifically, the spring constant can be changed from a low value before the pad abutting portion 45 is abutted with the connecting plate portion 38 to a high value after the pad abutting portion 45 is abutted with the connecting plate portion 38.

In the pair of pressing arms 44 configuring the circumferential pressing portion 33, one pressing arm 44 arranged on the axially outer side (rotor 8 side) is provided with, on a base portion thereof, an engaging portion 46 configured to engage an end portion of the return spring 24a. In the present embodiment, in order to stabilize a position of the end portion of the return spring 24a easily, the engaging portion 46 is formed as a triangular through hole.

The spring holding portion 34 is configured in a tongue piece shape, and is provided at a radially outward portion of the pad clip 23a. The spring holding portion 34 is provided to extend outward in the circumferential direction from the outer side plate portion 36 configuring the clamping portion 30, and is partially arranged between the pair of pressing arms 44. Therefore, in addition to the function of holding the return spring 24a, the spring holding portion 34 has a function of positioning the pad clip 23a in the radial direction when being abutted with the radially outer side surface of the projection portion 25, similarly with the outer side plate portion 36 configuring the clamping portion 30. The spring holding portion 34 includes a placing plate portion 47 which extends outward in the circumferential direction from the outer side plate portion 36, and a locking piece 48 which is bent outward in the radial direction from an circumferentially outer side portion of the placing plate portion 47, and the circumferentially outer side portion of the placing plate portion 47 and the locking piece 48 protrude outward in the circumferential direction than the base portion of the pair of the pressing arms 44.

The restraining portion 35 is configured in an inverted J shape, and is provided at a radially outer end portion of the pad clip 23a. The restraining portion 35 is provided to be continuous with the base portion of the pressing arm 44 on the axially inner side (an opposite side of the rotor 8) configuring the circumferential pressing portion 33, and includes a restraining base plate portion 49 which extends toward the radially outer side, and a hook portion 50 which is provided at a radially outer end portion of the restraining base plate portion 49. The hook portion 50 is folded back outward in the circumferential direction and is folded back inward in the radial direction. The restraining portion 35 is provided to allow the return spring 24a to be attached to the pad clip 23a in a state before the inner pad 4a is assembled, so as to support an elastic force (return force) of the return spring 24a and restrain the return spring 24a. An assembly of the pad clip 23a and the return spring 24a can be configured by the restraining portion 35.

Figure 7:
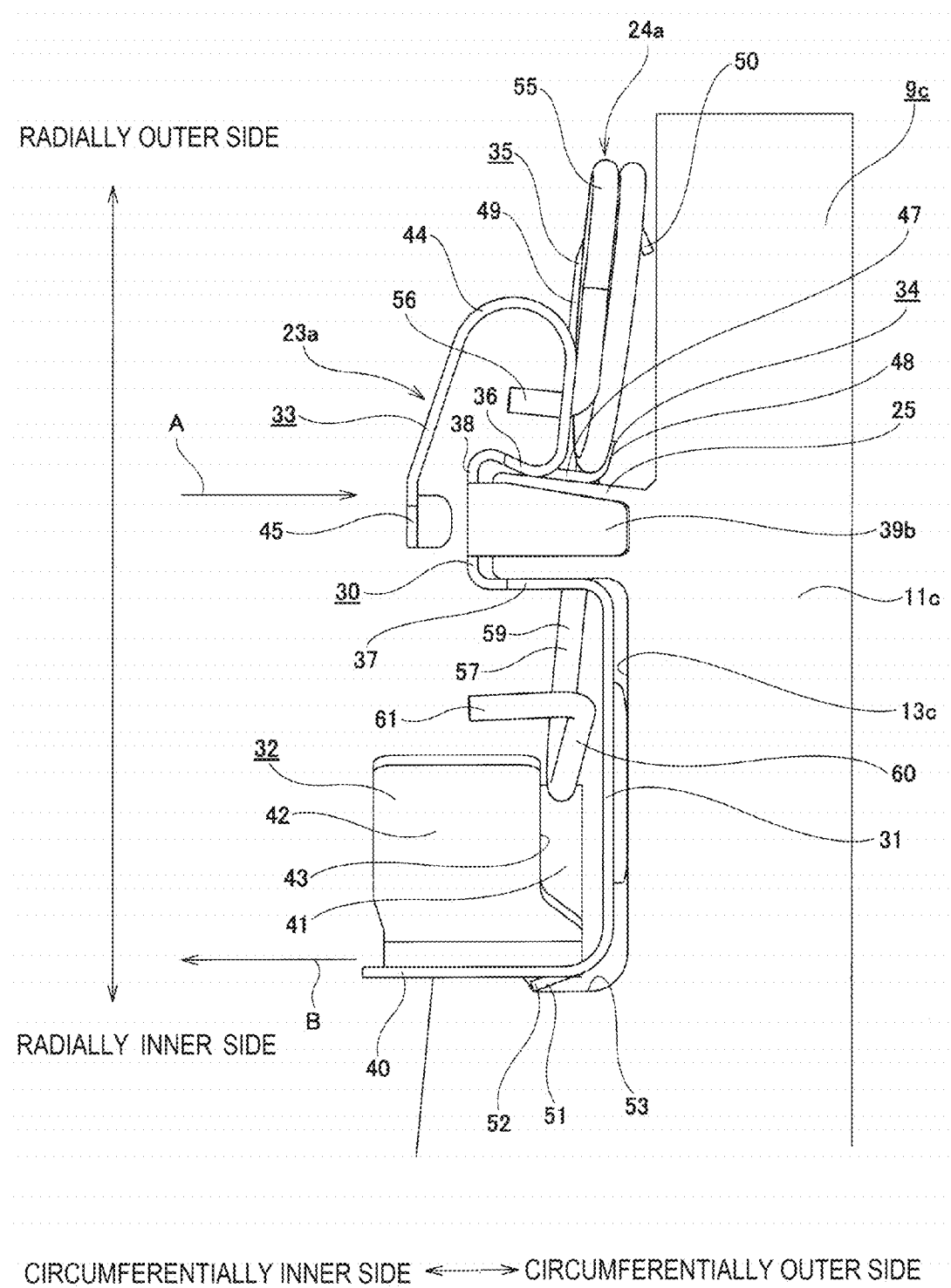
FIG. 7 is a view of a state where an assembly of a pad clip and a return spring which is to be arranged on the rotation-in side and the axially inner side is assembled to a support, as seen from the axially outer side.
Figure 8:
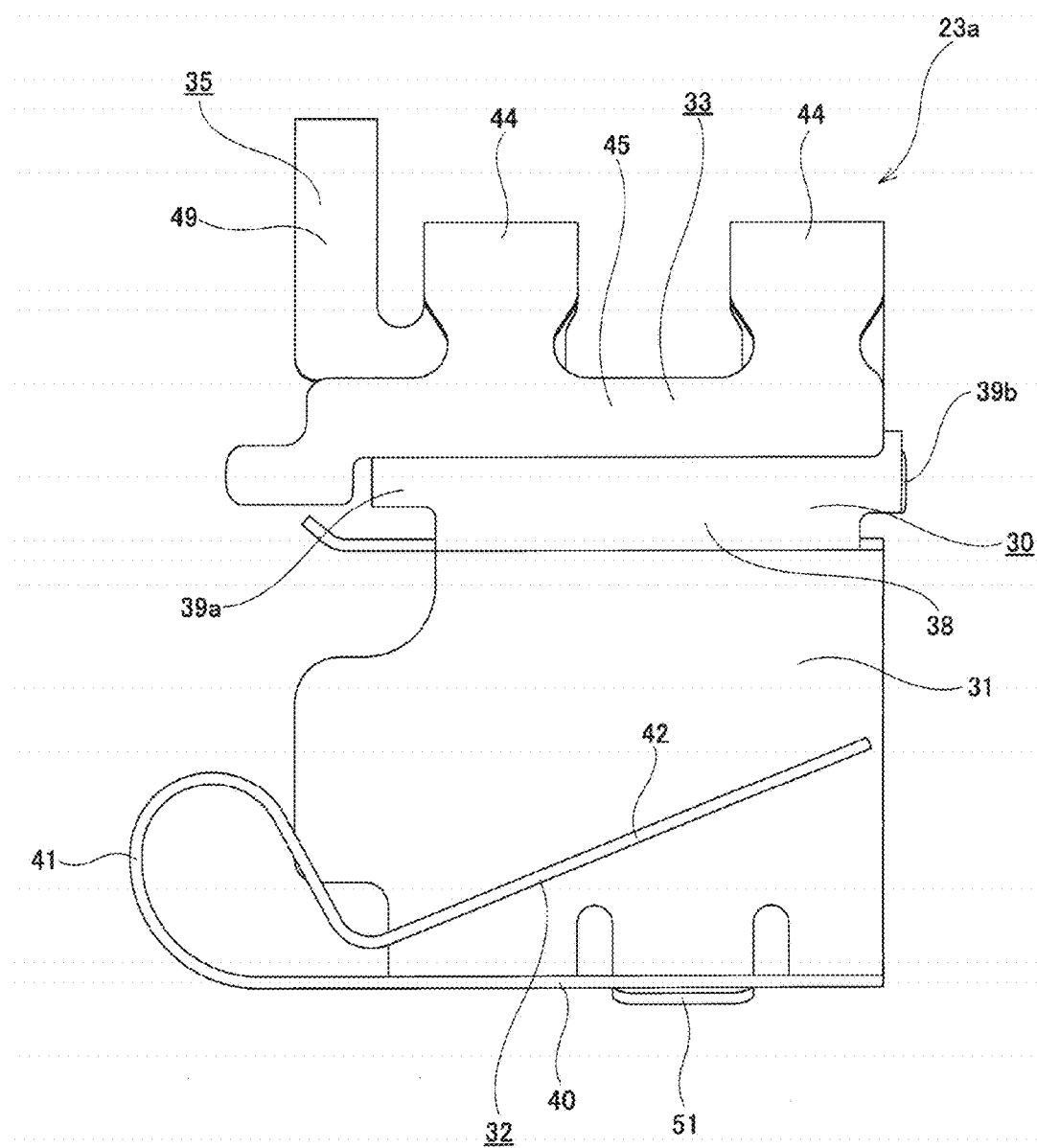
FIG. 8 is a front view showing the pad clip to be arranged on the rotation-in side and the axially inner side in a taken out state.
Figure 9:
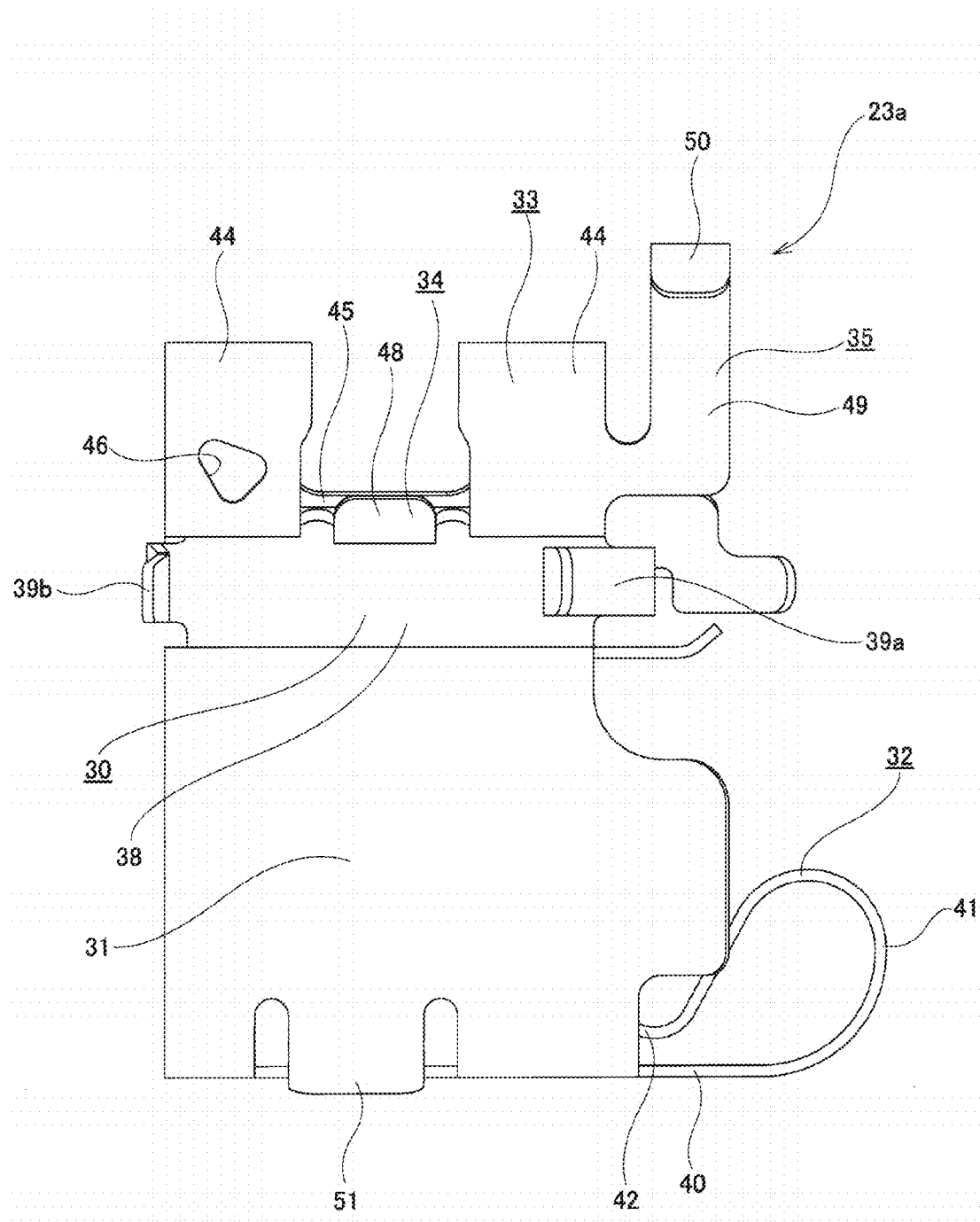
FIG. 9 is a back view showing the pad clip to be arranged on the rotation-in side and the axially inner side in a taken out state.
Figure 10:
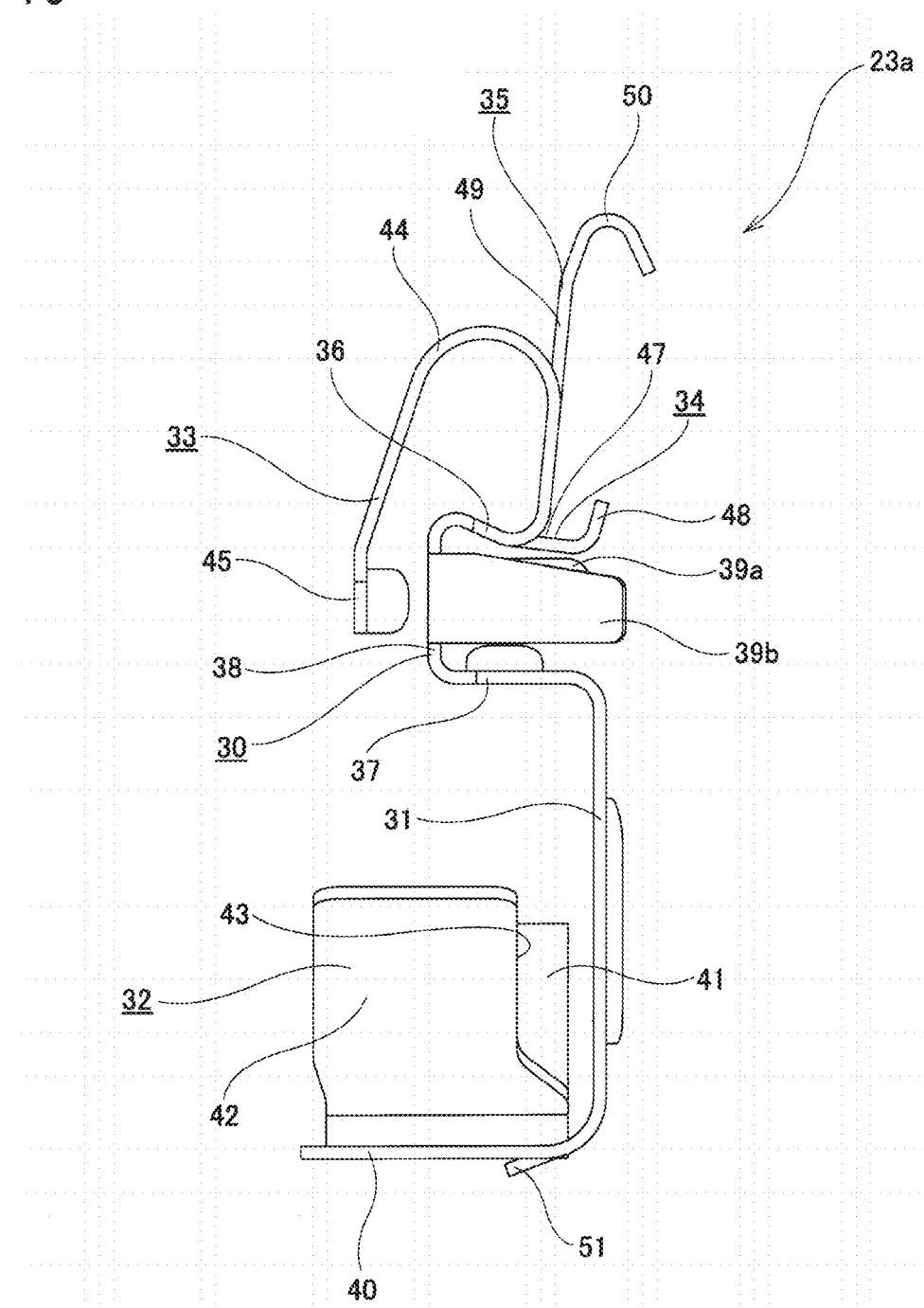
FIG. 10 is a side view showing the pad clip to be arranged on the rotation-in side and the axially inner side in a taken out state as seen from the right side of FIG. 8.
Figure 11A:
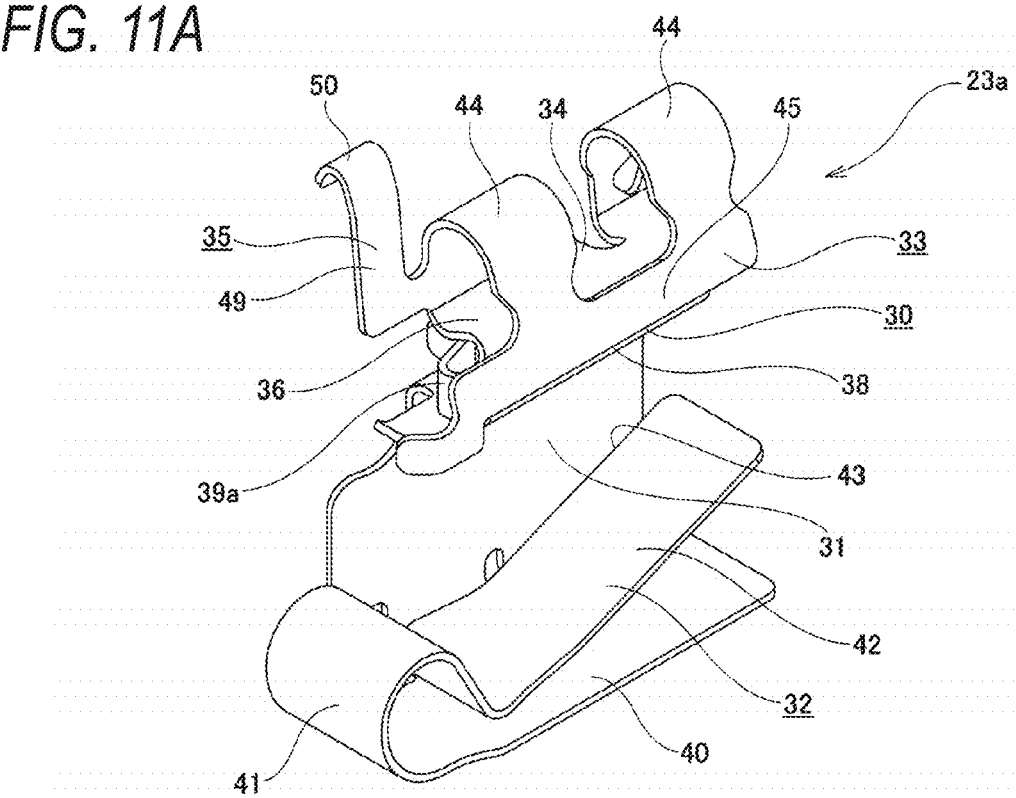
Figure 11B:
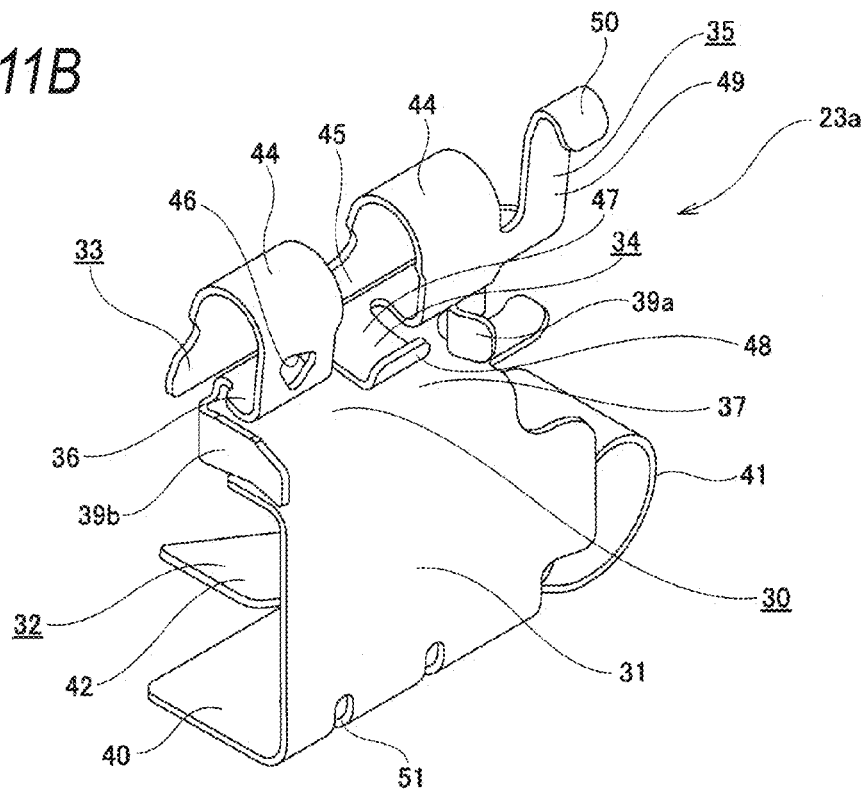

In the pad clip 23a, a third pawl piece 51 is provided at an axially intermediate portion of the pressing base plate portion 40 configuring the radial pressing portion 32. The third pawl piece 51 forms a C-shaped cut in a range from the guide plate portion 31 to the pressing base plate portion 40, and is formed by bending and raising an inner side of the cut toward the radially inner side. As shown in FIG. 7, a tip end edge of the third pawl piece 51 is engaged with the locking step portion 52 formed on the radially inner side surface of the recessed portion 13c, and thus a posture of the pad clip 23a is maintained. Specifically, since a force toward the circumferentially outer side as indicated by an arrow A acts on the radially outer side portion of the pad clip 23a via the circumferential pressing portion 33, the radially inner side portion of the pad clip 23a tends to move inward in the circumferential direction as indicated by an arrow B. In contrast, in the present embodiment, the third pawl piece 51 is locked with the locking step portion 52, so that the radially inner side portion of the pad clip 23a is prevented from displacing inward in the circumferential direction and the posture of the pad clip 23a is maintained. The locking step portion 52 as described above can be provided by processing a recess 53 at an innermost part of the radially inner side surface of the recessed portion 13c, but the recess 53 can be processed at once by using a rotary cutting tool such as a hand grinder, and can also be processed a plurality of times using a plurality of broach cutters having different tooth tip shapes.

Figure 12A:
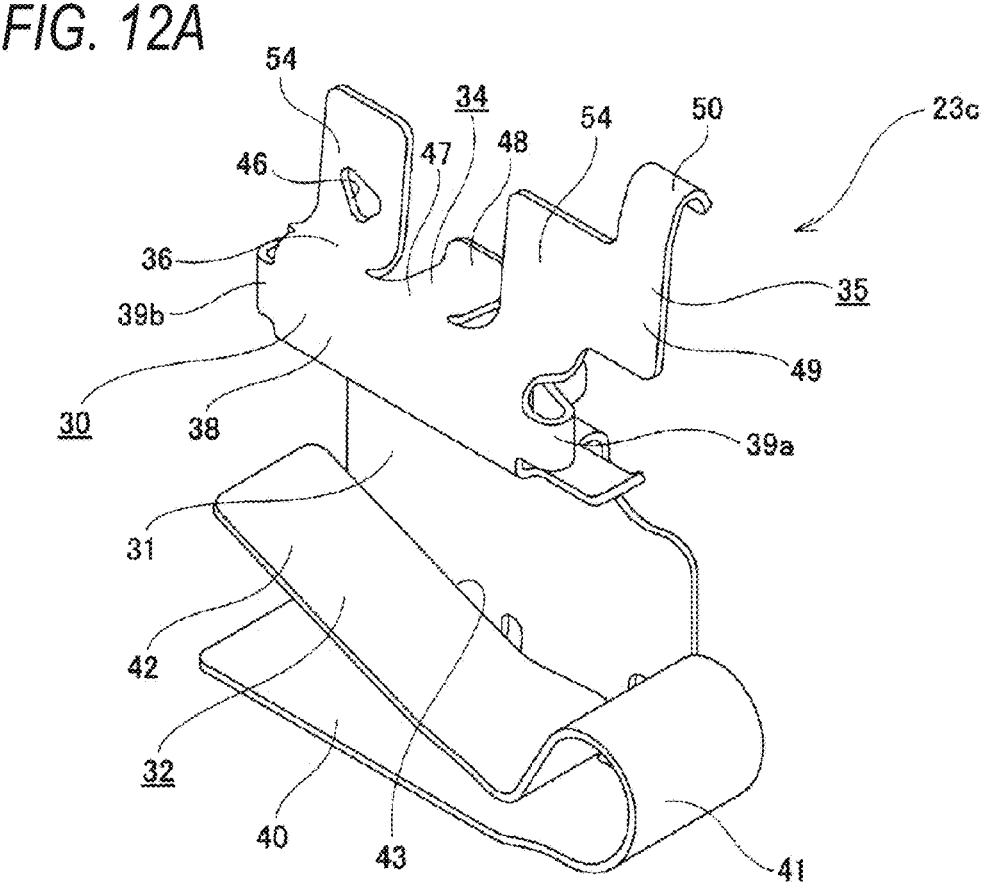
Figure 12B:
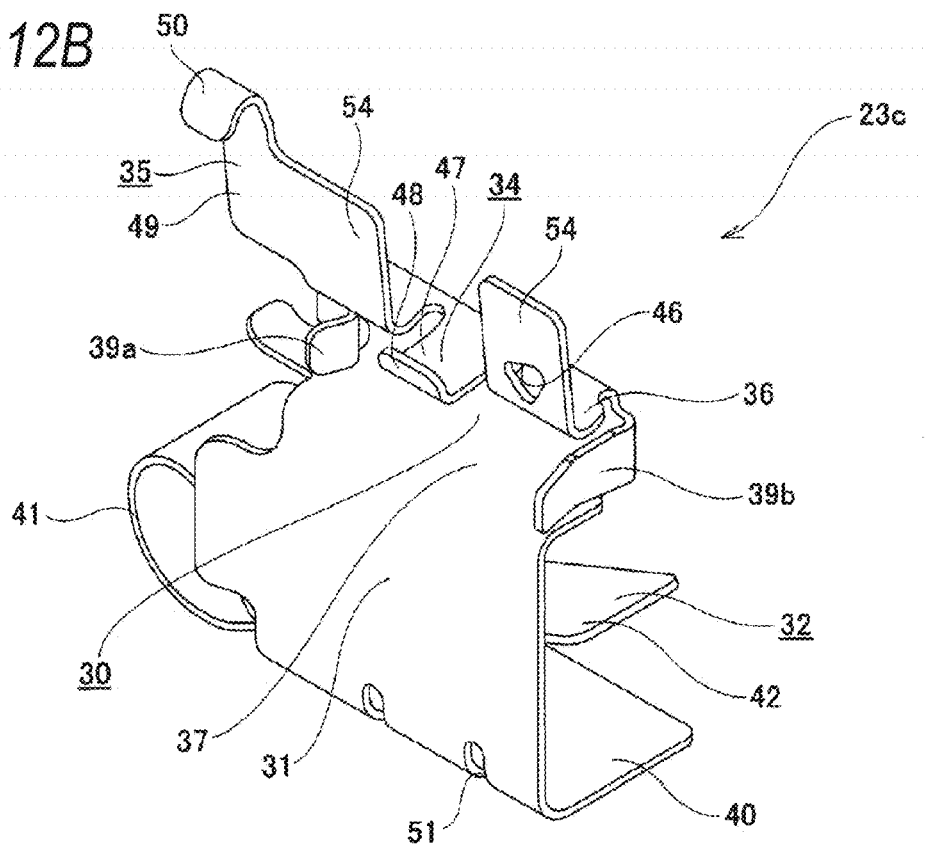

Meanwhile, as shown in FIGS. 12A and 12B, the basic configuration of the pad clip 23c arranged on the rotation-out side is the same as that of the pad clip 23a arranged on the rotation-in side, but a part of the shape is different. That is, the pad clip 23c arranged on the rotation-out side is manufactured, similarly with the pad clip 23a arranged on the rotation-in side, by pressing a metal plate having elasticity and corrosion resistance such as a stainless steel plate, and includes a clamping portion 30, a guide plate portion 31, an radial pressing portion 32, a spring holding portion 34, and a restriction portion 35. However, the pad clip 23c arranged on the rotation-out side does not include the circumferential pressing portion 33 (refer to FIGS. 11A and 11B, etc.), and instead, the pad clip 23c includes a pair of upright plate portions 54, which have substantially the similar shape as the base portion of the pair of pressing arms 44 (refer to FIGS. 11A and 11B, etc.).

In the pair of upright plate portions 54, one upright plate portion 54 arranged on the axially outer side (rotor 8 side) is provided with an engaging portion 46 configured to engage the end portion of the return spring 24c. In order to stabilize the position of the end portion of the return spring 24c easily, the engaging portion 46 provided on the upright plate portion 54 is also formed as a triangular through hole. Further, the other upright plate portion 54 arranged on the axially inner side (opposite side of the rotor 8) is provided with an inverted J-shaped restraining portion 35 in a state of being continuous with the upright plate portion 54.

In the present embodiment, in order to separate friction surfaces of the linings 26, 28 configuring the inner and outer pads 4a, 5a from both axial side surfaces of the rotor 8 as the brake is released, the return springs 24a to 24d are respectively attached to the four pad clips 23a to 23d as described above.

Figure 13:
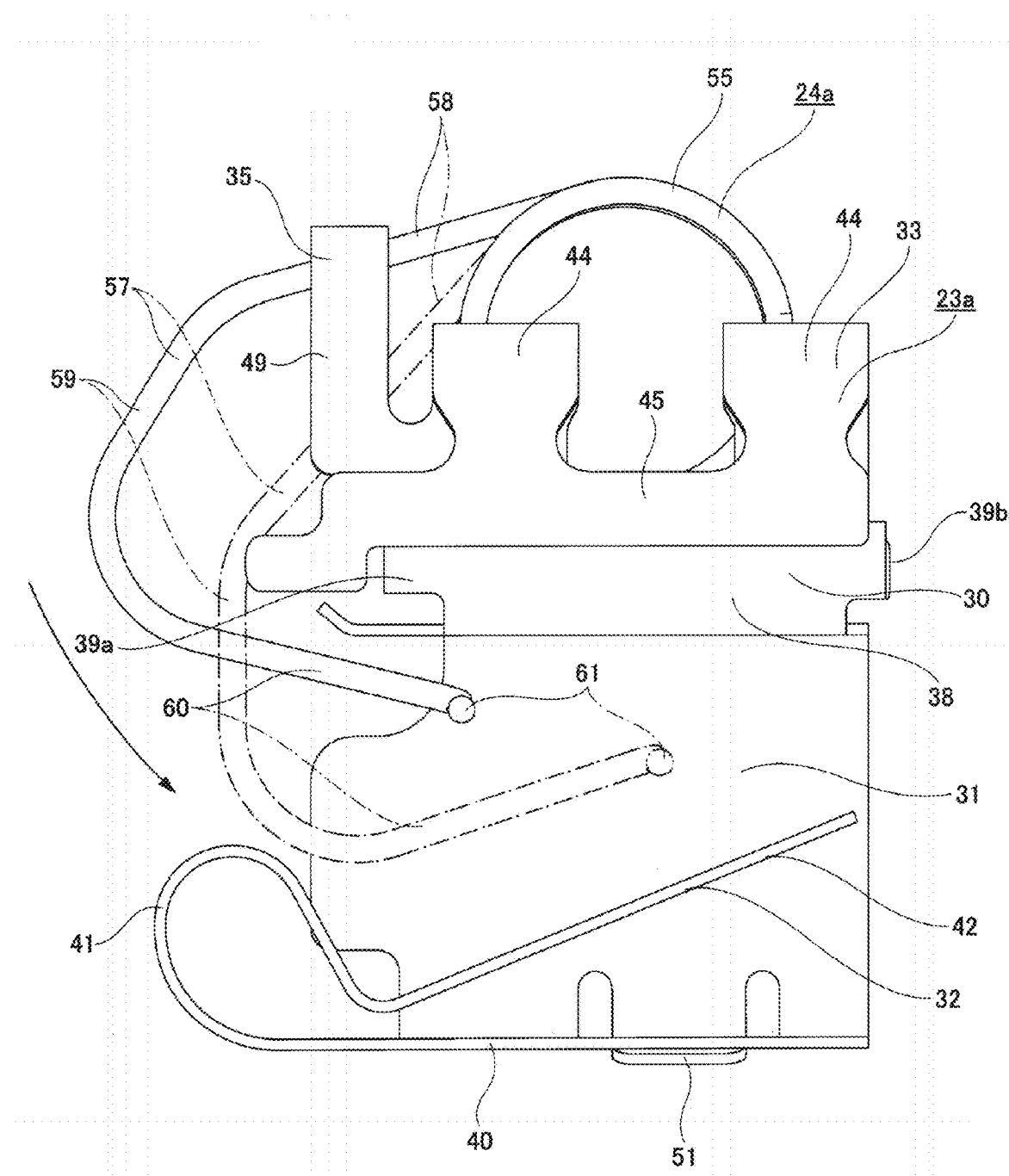
FIG. 13 is a front view showing the assembly of a pad clip and a return spring which is to be arranged on the rotation-in side and the axially inner side.
Figure 14:
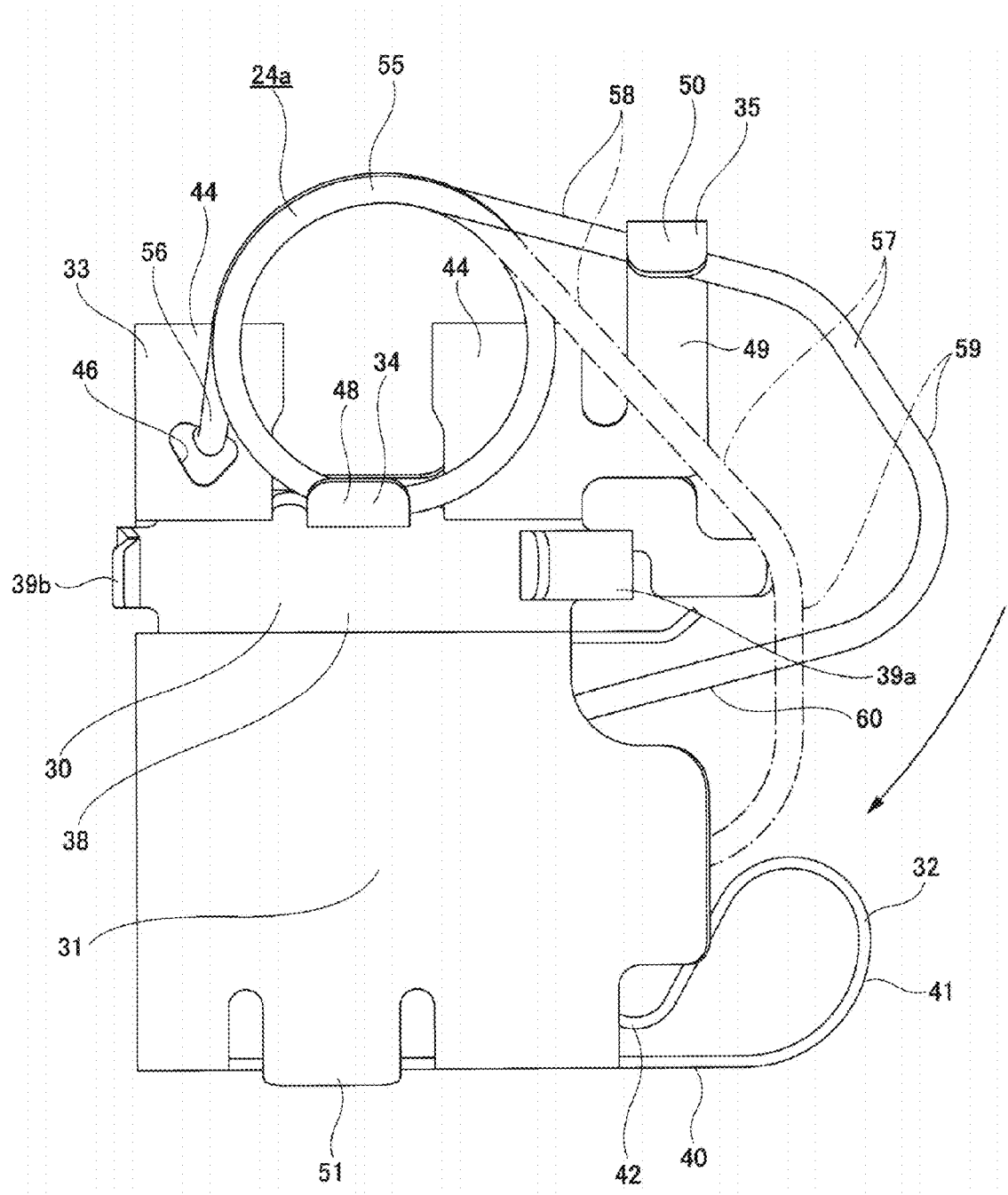
FIG. 14 is a back view showing the assembly of a pad clip and a return spring which is to be arranged on the rotation-in side and the axially inner side.
Figure 15:
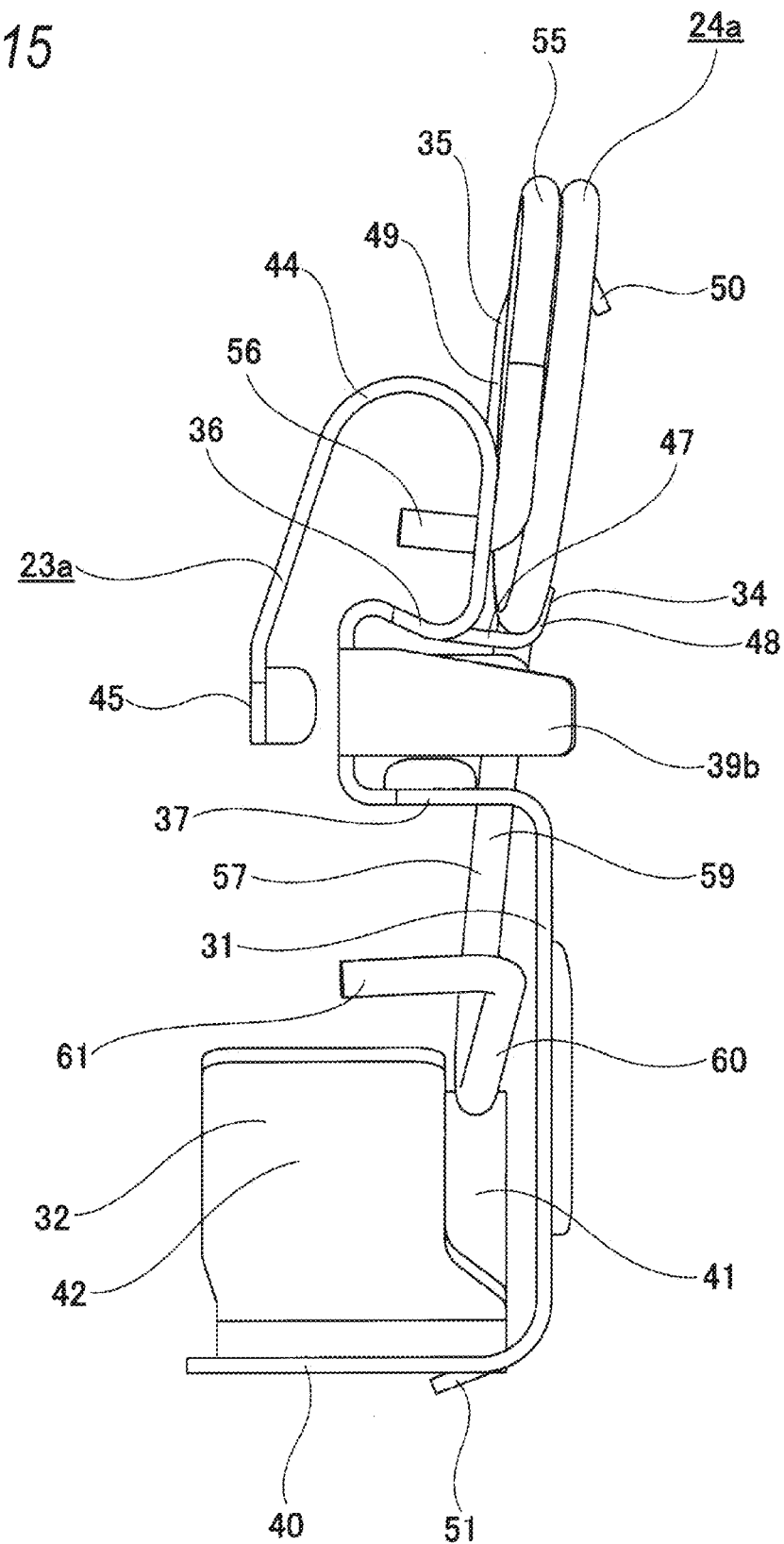
FIG. 15 is a side view showing the assembly of a pad clip and a return spring which is to be arranged on the rotation-in side and the axially inner side as seen from the right side of FIG. 13.
Figure 16:
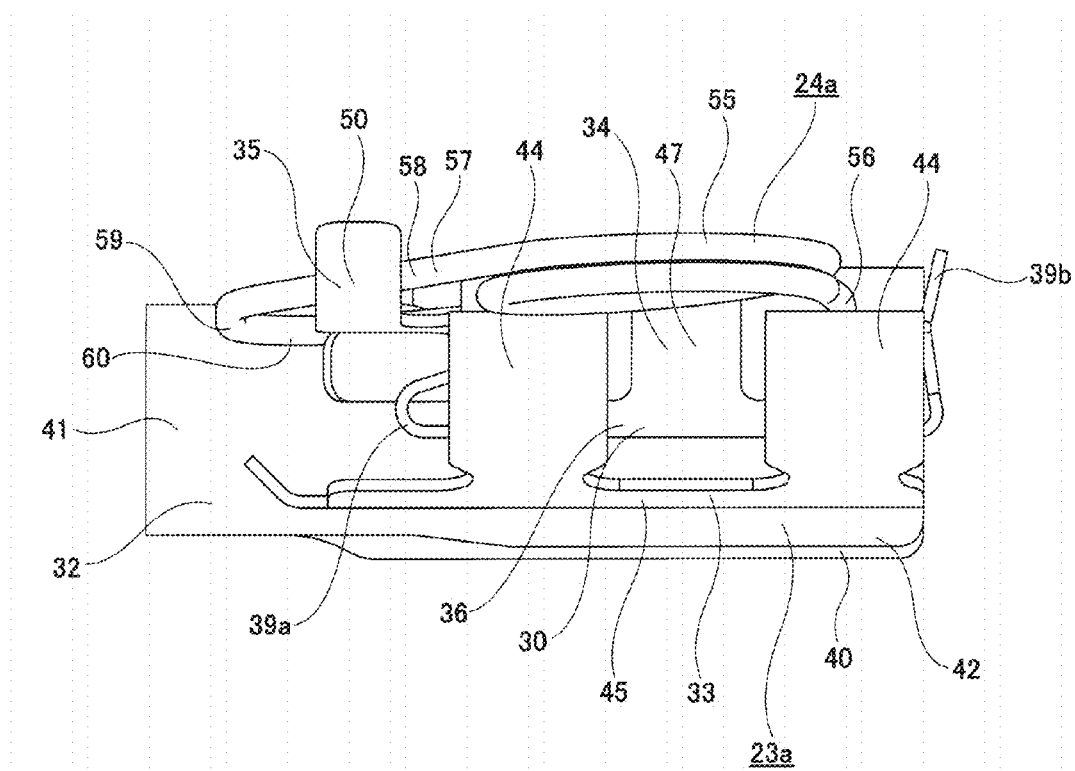
FIG. 16 is a plan view showing the assembly of a pad clip and a return spring which is to be arranged on the rotation-in side and the axially inner side.
Figure 17A:
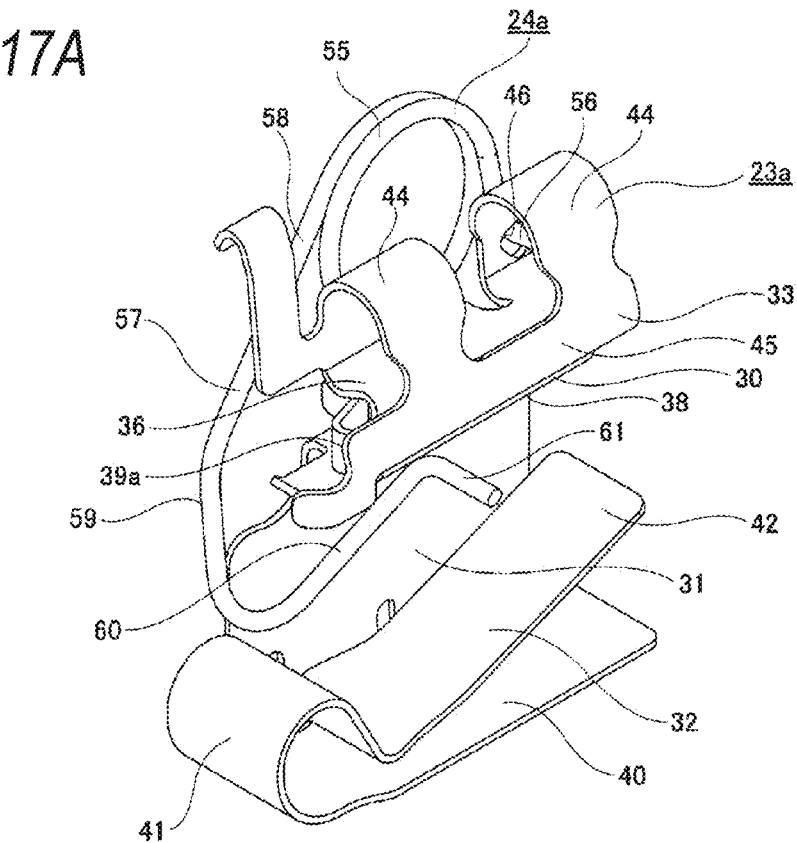
Figure 17B:
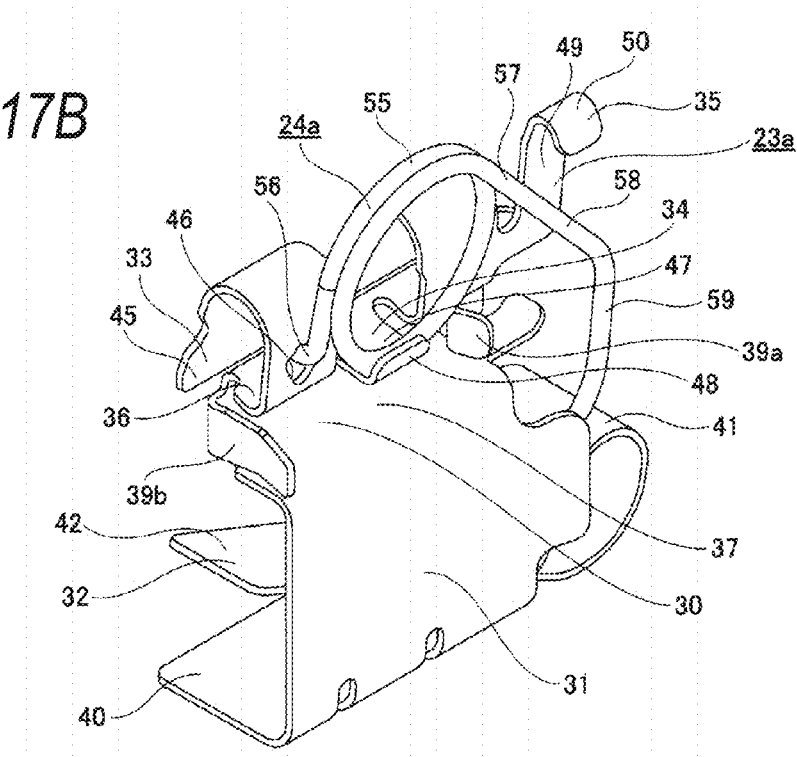
Figure 18A:
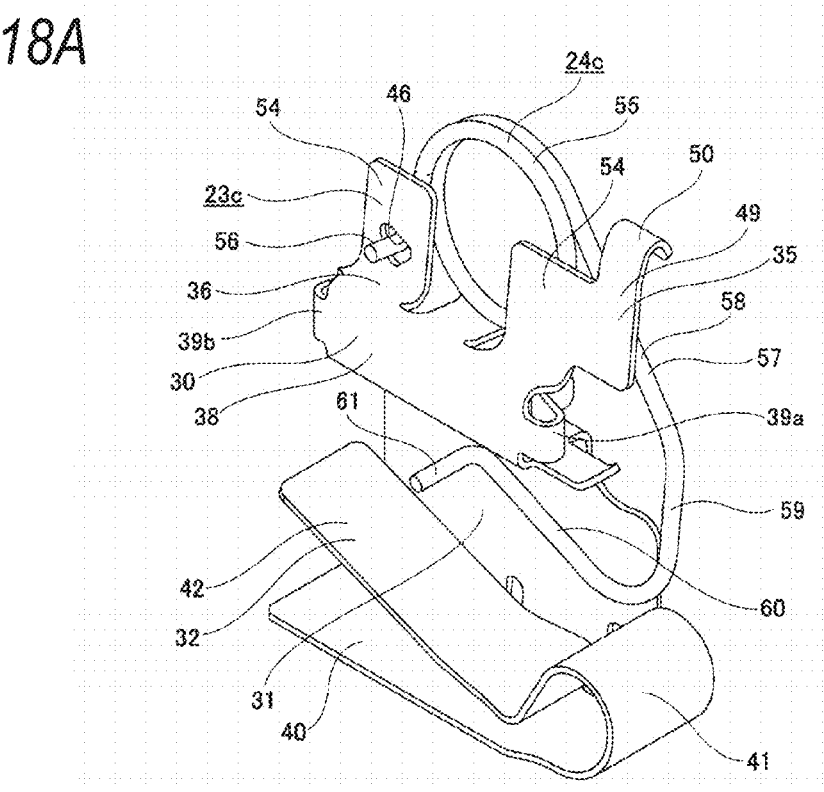
Figure 18B:
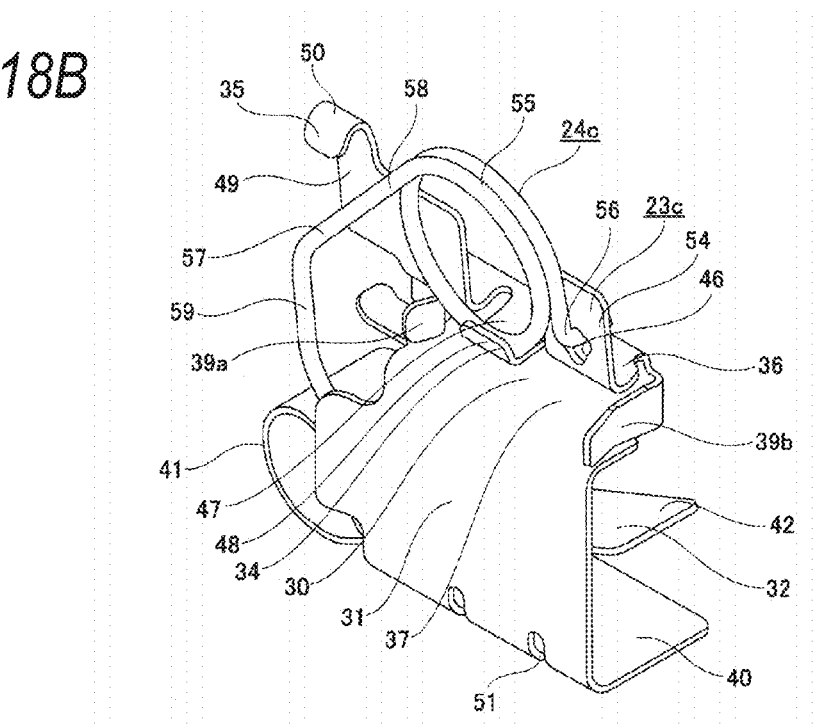
Figure 19:
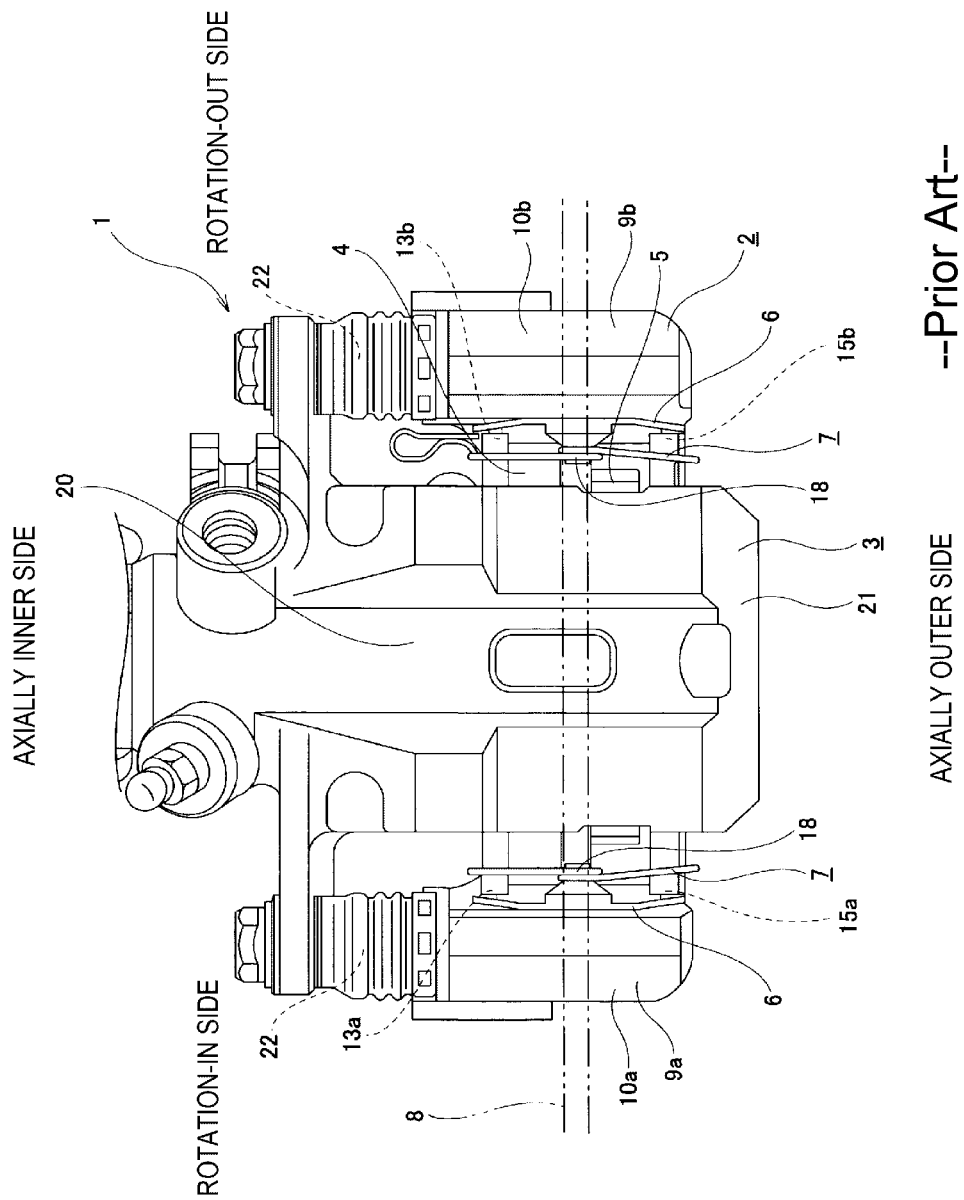
FIG. 19 is a view of a floating type disc brake with a conventional structure as seen from the radially outer side.
Figure 20:
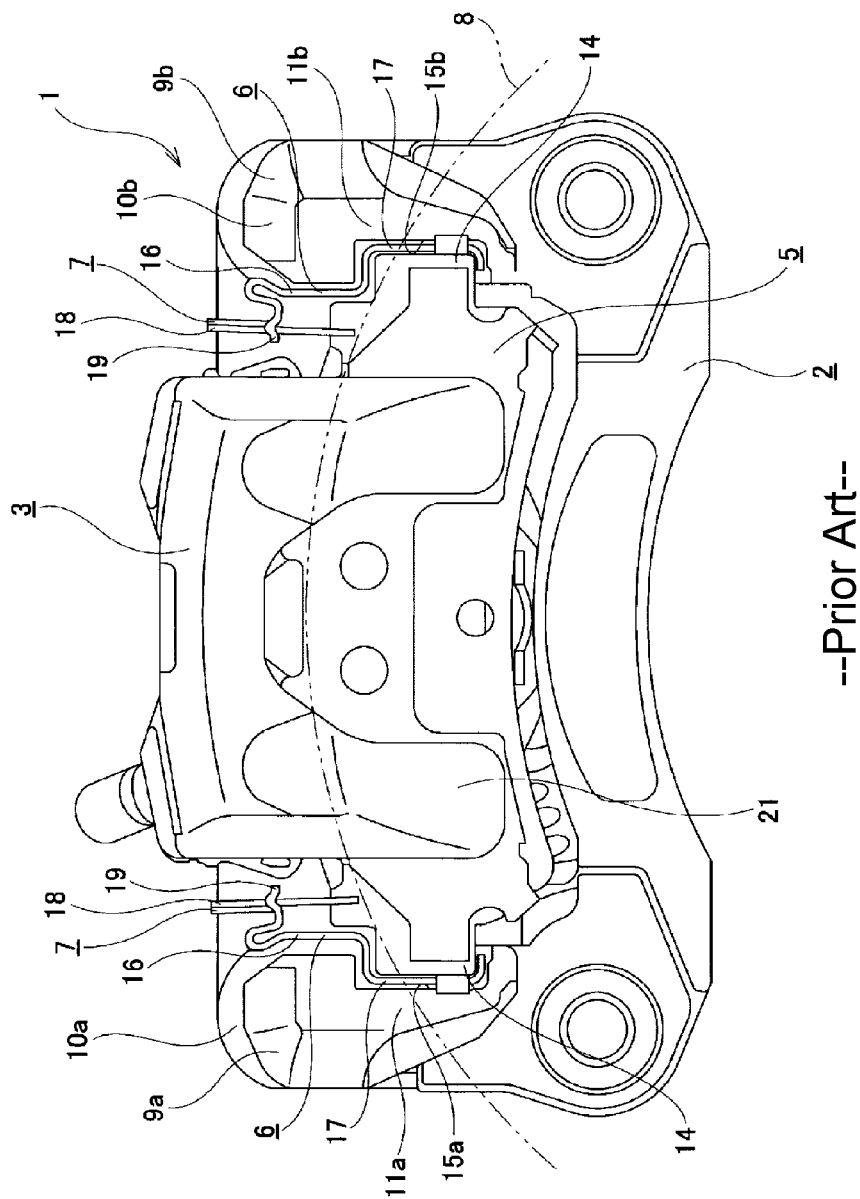
FIG. 20 is a view of the floating type disc brake with a conventional structure as seen from the axially outer side.
Figure 21:
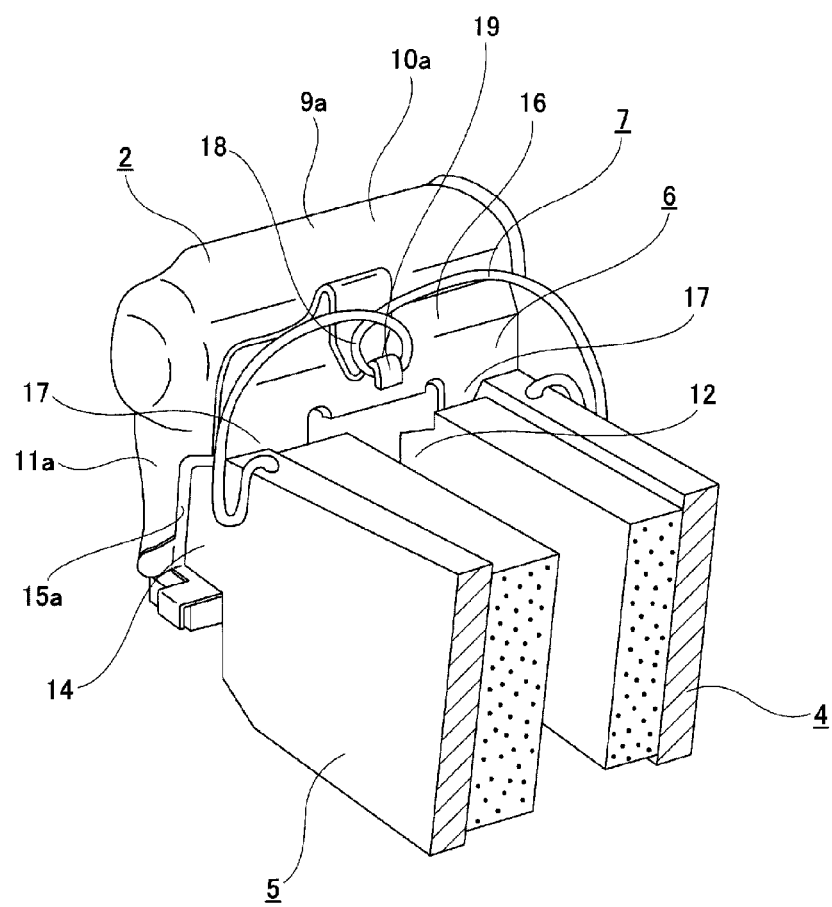
FIG. 21 is a partially cut perspective view of the floating type disc brake with a conventional structure.

Among the four return springs 24a to 24d, the pair of return springs 24a, 24b arranged on the rotation-in side (anti-anchor side) and the pair of return springs 24c, 24d arranged on the rotation-out side (anchor side) are symmetrical with each other relative to the axial direction. Further, the pair of return springs 24a, 24c arranged on the axially inner side and the pair of return springs 24b, 24d arranged on the axially outer side are symmetrical with each other relative to the circumferential direction. Therefore, the four return springs 24a to 24d are of two types of return springs, and the two types of return springs are symmetrical to each other. For this reason, as for detailed description of the return springs 24a to 24d, the return spring 24a arranged on the rotation-in side and on the axially inner side will be described as an example with reference to FIG. 13 to FIGS. 17A and 17B. In FIGS. 13 and 14, a shape of the return spring 24a in a state of being attached to the pad clip 23a is indicated by a solid line and a shape of the return spring 24a in the state where the inner pad 4a (caliper) is assembled is indicated by a one-dot chain line, but the shape in a state where the inner pad 4a is assembled is indicated by a solid line in other figures.

The return spring 24a is a torsion coil spring formed by bending a wire material of spring steel for example, a stainless steel, or a piano wire, and includes a coil portion 55, an engaging arm 56 and a spring arm 57 which are arranged on both axial sides. The coil portion 55 is interposed between the engaging arm 56 and the spring arm 57.

The coil portion 55 is arranged in an installation space formed by arranging the base portion of the pair of pressing arms 44 on the circumferentially inner side of the guide plate portion 31 in a state where an center axis of the coil portion 55 is oriented in the circumferential direction, and is held by the spring holding portion 34 of the pad clip 23a. Specifically, the coil portion 55 is supported (clamped) from both circumferential sides thereof by the base portion of the pair of arms 44 and the locking piece 48 in a state of being provided on an upper surface of the placing plate portion 47 so as to stand toward back surface (circumferential outer surface) of the base portion of the pair of pressing arms 44.

A length of the engaging arm 56 arranged on the axially outer side (rotor 8 side) of the coil portion 55 is shorter than that of the spring arm 57, and a tip end of the engaging arm 56 is bent inward in the circumferential direction. The tip end portion of the engaging arm 56 is inserted and locked inside the engaging portion 46 formed in the base portion (upright plate portion 54) of one pressing arm 44 configuring the circumferential pressing portion 33, from the circumferentially outer side. Specifically, the tip end portion of the engaging arm 56 is pressed to a radially outer side edge of an opening of the engaging portion 46 based on the elastic restoring force of the return spring 24a.

The spring arm 57 arranged on the axially inner side (opposite side of the rotor 8) of the coil portion 55 includes a restrained portion 58, a radial arm 59, an axial arm 60 and an abutting portion 61 in an order from a base end side connected to the coil portion 55 toward a tip end side.

The restrained portion 58 is a portion restrained by the hook portion 50 provided on the pad clip 23a by the elastic restoring force of the return spring 24a. The restrained portion 58 obliquely extends inward in the axial direction and inward in the radial direction. In addition, the restrained portion 58 is arranged on the circumferentially outer side of the restraining base plate portion 49.

The radial arm 59 is linear and provided to extend inward in the radial direction from the tip end of the restrained portion 58.

Figure 2:
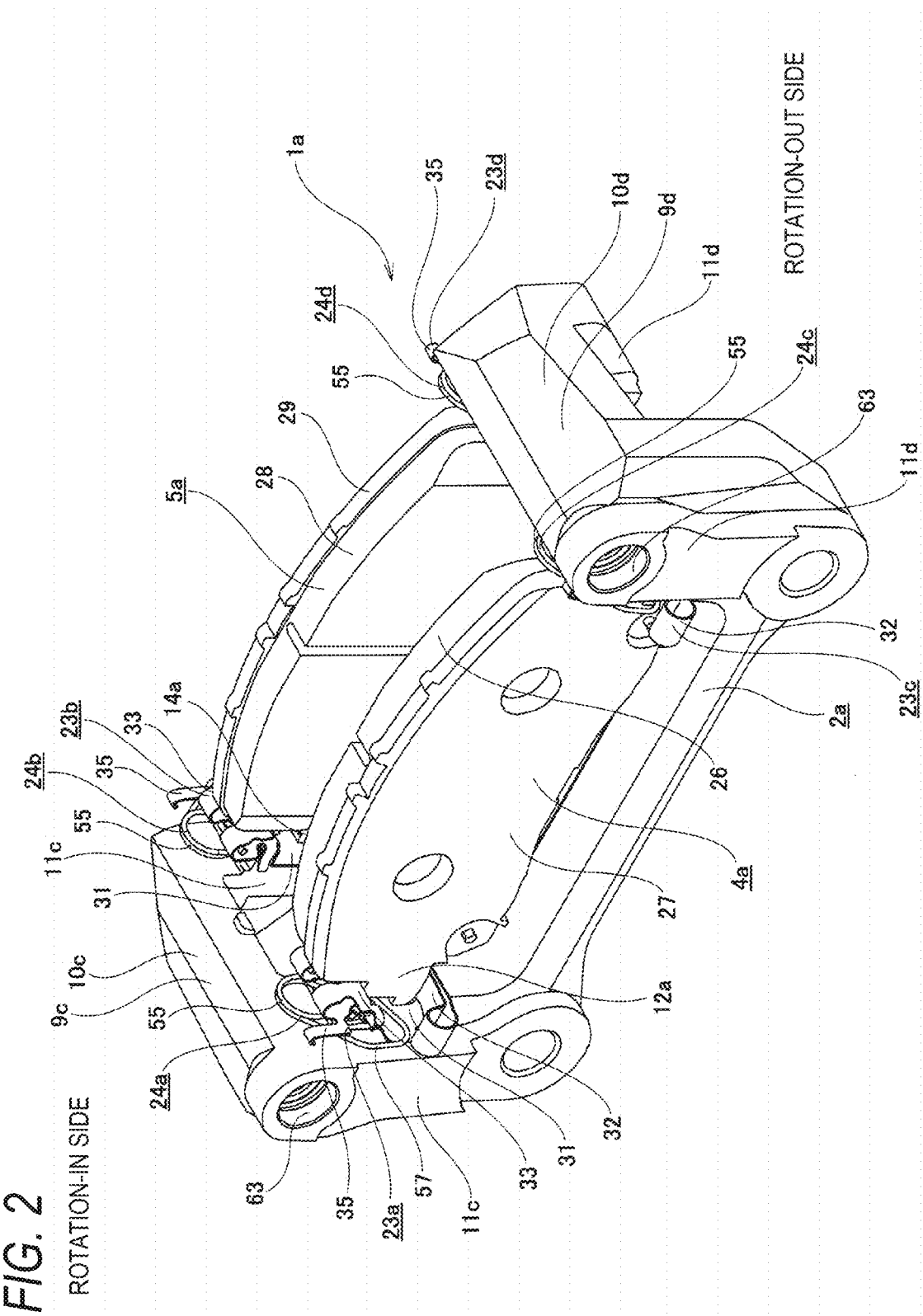
FIG. 2 is a perspective view of the floating type disc brake according to the embodiment as seen from the axially inner side and a rotation-out side.
Figure 3:
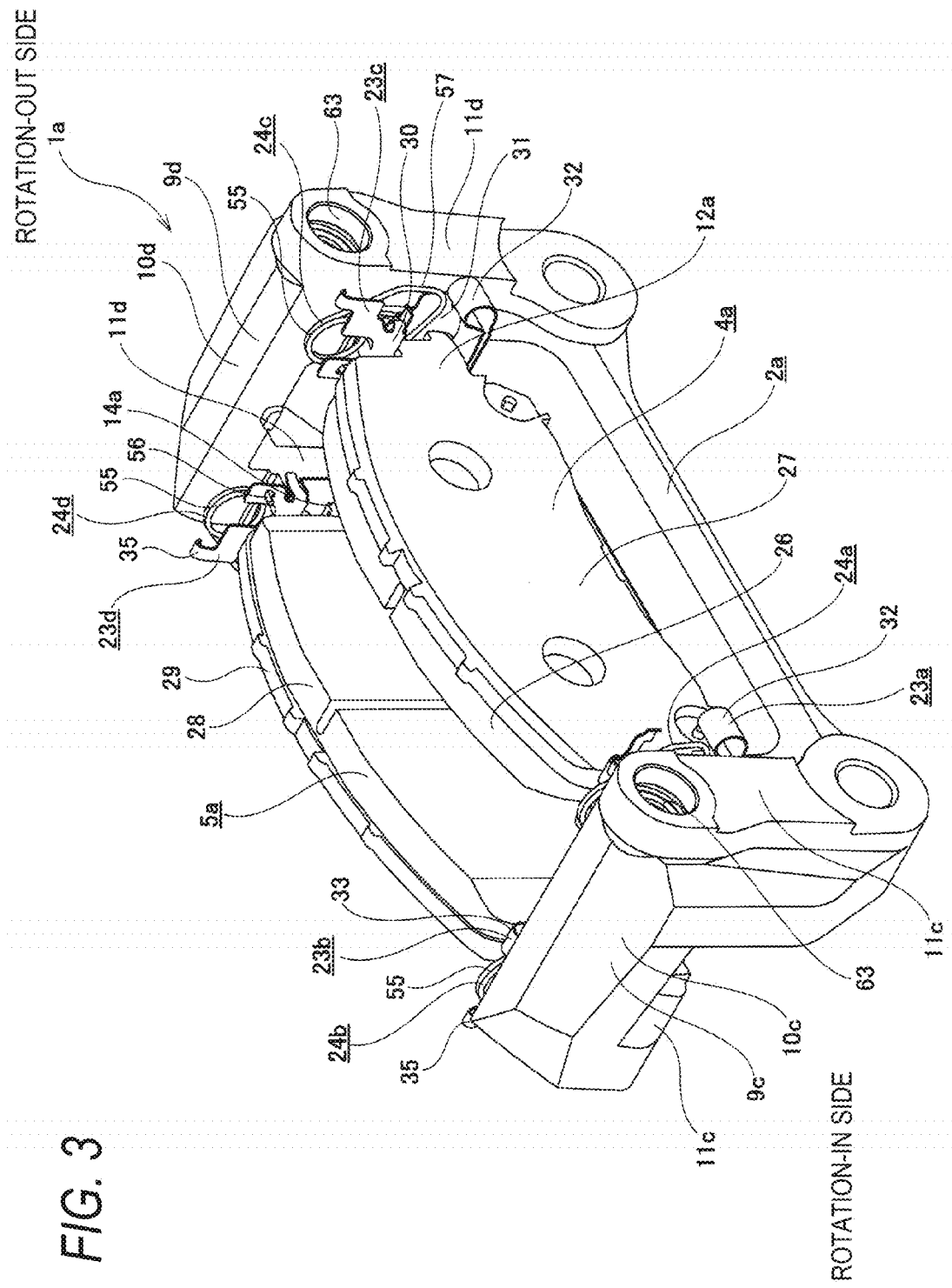
FIG. 3 is a perspective view of the floating type disc brake according to the embodiment as seen from the axially inner side and a rotation-in side.

The axial arm 60 extends to be bent at a substantial right angle from a radially inner end portion of the radial arm 59 to the axially outer side (rotor 8 side), and is arranged at a portion in the radial direction between the inner side plate portion 37 configuring the clamping portion 30 and the pressing body portion 42 configuring the radial pressing portion 32. In the present embodiment, the base portion of the pair of pressing arms 44 is offset inward in the circumferential direction from the guide plate portion 31, and thus the axial arm 60 can be guided into an inner side of the guide plate portion 31 in the circumferential direction without largely bending a part of the spring arm 57 in the circumferential direction. As shown in FIGS. 2 and 3, etc., in order to prevent interfere between the axial arm 60 and the ear portion 12a of the inner pad 4a, an escape recessed portion 62 is formed at a circumferentially outer end portion of the ear portion 12a, and the axial arm 60 is inserted inside of the escape recessed portion 62 in the axial direction.

The abutting portion 61 is provided to be bent inward in the circumferential direction from an axially outer end portion (an end portion on the rotor 8 side) of the axial arm 60, and is abutted on an axially outer side surface of the ear portion 12a of the inner pad 4a so as to press the inner pad 4a to the axially inner side (opposite side of the rotor 8).

A main part of the return spring 24a having the above configuration is arranged on the circumferentially outer side (back surface side) of the pad clip 23a in a state of being attached on the pad clip 23a, except a part of the spring arm 57 (the axial arm 60 and the abutting portion 61), and the return spring 24a protrudes from the pad clip 23a not only in the circumferential direction but also largely in the axial direction and the radial direction.

In the present embodiment, when assembling of the floating type disc brake 1a, before the inner and outer pads 4a, 5a are assembled to the support 2a, as shown in FIGS. 13 to 18, the return spring 24a (24b to 24d) is attached to the pad clip 23a (23b to 23d). Hereinafter, an operation procedure for attaching the return spring 24a to the pad clip 23a will be described.

First, the coil portion 55 of the return spring 24a is held by the spring holding portion 34 of the pad clip 23a, and the tip end portion of the engaging arm 56 of the return spring 24a is inserted into the engaging portion 46. In the present embodiment, since the engaging portion 46 is formed as a triangular through hole, the tip end portion of the engaging arm 56 can be inserted therein from the radially inner side portion of the engaging portion 46 whose opening width is increased. Therefore, the insertion can be easily realized. Next, the restrained portion 58 of the spring arm 57 is restrained by the hook portion 50 in a state where the spring arm 57 is elastically deformed inward in the radial direction and outward in the axial direction so as to bring the spring arm 57 close to the engaging arm 56. Therefore, since the tip end portion of the engaging arm 56 is configured to move outward in the radial direction by the elastic restoring force of the return spring 24a, the tip end portion moves to the radially outer side where the opening width narrows while being guided by the opening edge of the engaging portion 46 and is elastically pressed to a part (preferably a corner portion) of the opening edge. Further, since the restrained portion 58 is also configured to move outward in the radial direction due to the elastic restoring force of the return spring 24a, the restrained portion 58 is elastically pressed by the hook portion 50. On the contrary, the coil portion 55 is pressed inward in the radial direction with respect to the placing plate portion 47 of the spring holding portion 34. Therefore, positioning of the return spring 24a in the radial direction relative to the pad clip 23a is realized. Since the coil portion 55 is clamped from both circumferential sides thereof by the base portion of the pair of pressing arms 44 and the locking piece 48, the positioning of the return spring 24a relative to the pad clip 23a in the circumferential direction is also realized. Further, the coil portion 55 is prevented from being inclined (tilted) in the circumferential direction.

The attachment of the return spring 24a (24b to 24d) to the pad clip 23a (23b to 23d) can be performed at a factory for assembling the disc brake, and can also be performed in advance at a supplier of the parts (a factory for manufacturing the pad clip, the return spring, etc.). In a case where the attachment is performed at the supplier of parts, each step of loading, setting up and assembling is carried out keeping the assembly of the pad clip 23a (23b to 23d) and the return spring 24a (24b to 24d) as it is in the factory for assembling the disk brake.

As described above, after the return spring 24a (23b to 23d) was attached to the pad clip 23a (24b to 24d) (after the assembly in the attached state is prepared), the assembly of the pad clip 23a (23b to 23d) and the return spring 24a (24b to 24d) is to be assembled to the support 2a. That is, the projection portion 25 provided on the circumferentially inner side surface of the pad guide portion 11c (11d) is elastically clamped from both radial sides thereof by the clamping portion 30 (the outer side plate portion 36 and the inner side plate portion 37 configuring the pad clip 23a (23b to 23d). Further, the inner side plate portion 37, the guide plate portion 31, and the pressing base plate portion 40 which are configured in a substantially U-shape are fitted and supported in the recessed portion 13c (13d, 15c, 15d) of the pad guide portion 11c (11d).

Next, the inner and outer pads 4a and 5a are assembled to the support 2a.

Specifically, the pair of ear portions 12a provided on the inner pad 4a are inserted to the inner side of the recessed portions 13c, 13d of the pad guide portions 11c, 11d on the axially inner side, from the axially inner side (opposite side of the rotor 8) via the pad clips 23a, 23c. Then, the pad abutting portion 45 of the circumferential pressing portion 33 configuring the pad clip 23a is displaced outward in the circumferential direction by the ear portion 12a on the rotation-in side, and the pressing body portion 42 of the radial pressing portion 32 configuring the pad clip 23a, 23c is displaced inward in the radial direction by the ear portions 12a on the rotation-in side and the rotation-out side. The pair of ear portions 14a provided on the outer pad 5a are inserted to the inner side of the recessed portions 15c, 15d of the pad guide portions 11c, 11d on the axially outer side, from the axially inner side (opposite side of the rotor 8) via the pad clips 23b, 23d. Then, the pad abutting portion 45 of the circumferential pressing portion 33 configuring the pad clip 23b is displaced outward in the circumferential direction by the ear portion 14a on the rotation-in side, and the pressing body portion 42 of the radial pressing portion 32 configuring the pad clip 23b, 23d is displaced inward in the radial direction by the ear portions 14a on the rotation-in side and the rotation-out side.

As described above, in a state where the inner and outer pads 4a, 5a are assembled to the support 2a, the following forces are applied to the inner and outer pads 4a, 5a.

That is, since the pad abutting portions 45 of the circumferential pressing portions 33 configuring the pad clips 23a, 23b are elastically abutted against the circumferentially outer side surface on the rotation-in side of the inner and outer pads 4a, 5a, pressing forces directed inward in the circumferential direction (toward the rotation-out side) are applied to the inner and outer pads 4a, 5a. Thus, the direction of the pressing forces applied from the circumferential pressing portions 33 to the inner and outer pads 4a, 5a is the same as a direction of a tangential force acting on the basis of the contact with the rotor 8 during braking. Therefore, in the present embodiment, regardless of the presence or absence of braking, both the inner and outer pads 4a, 5a can be displaced toward the rotation-out side (pressed against the pad guide portion 11d on the rotation-out side), and rattling of the inner and outer pads 4a, 5a in the circumferential direction can be prevented.

Since the pressing body portions 42 of the radial pressing portions 32 configuring the pad clips 23a to 23d are elastically abutted against the radially inner side surface of the ear portions 12a, 14a of the inner and outer pads 4a, 5a, pressing forces directed outward in the radial direction are applied to the ear portions 12a, 14a. Thus, the ear portions 12a, 14a are elastically pressed against the inner side plate portions 37 covering the radially outer side surfaces of the recessed portions 13c, 13d, 15c, and 15d. Therefore, rattling of the ear portions 12a, 14a on the radially inner side of the recessed portions 13c, 13d, 15c and 15d can be prevented.

In a state where the inner and outer pads 4a, 5a are assembled, elastic forces are not applied to the inner and outer pads 4a, 5a from the return springs 24a to 24d. However, in a state where a caliper (not shown) is assembled, both the inner and outer pads 4a, 5a are brought slightly close to each other in the axial direction, and the return springs 24a to 24d apply elastic forces to separate the inner and outer pads 4*a*, 5*a* from each other. In this state, the restrained portions 58 configuring the return springs 24*a* to 24*d* are separated (positioned inward in the radial direction) from the hook portions 50.

The operation of the floating type disc brake 1*a* during braking and braking release is as follows.

Figure 4:
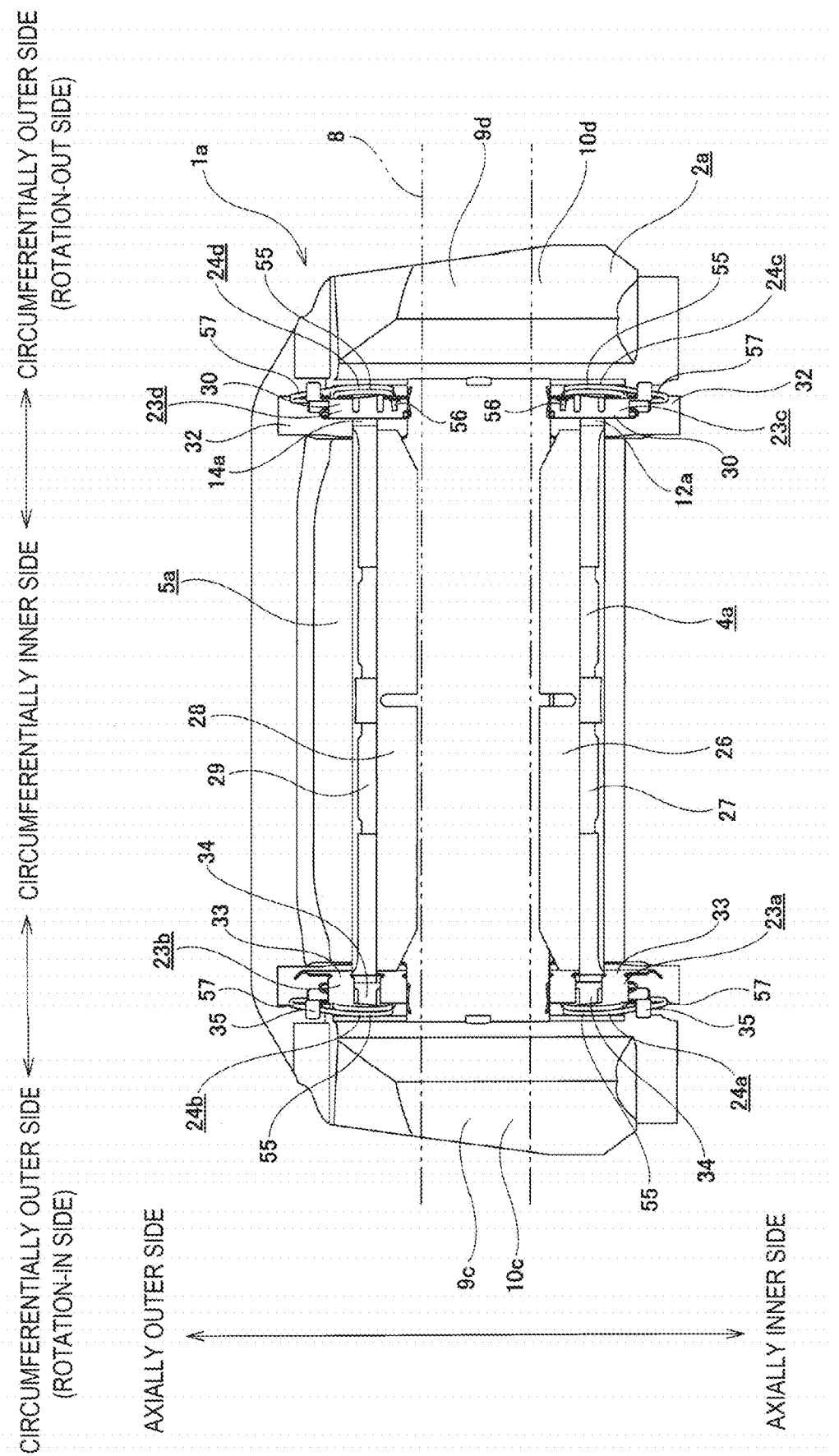
FIG. 4 is a view of the floating type disc brake according to the embodiment as seen from a radially outer side.
Figure 5:
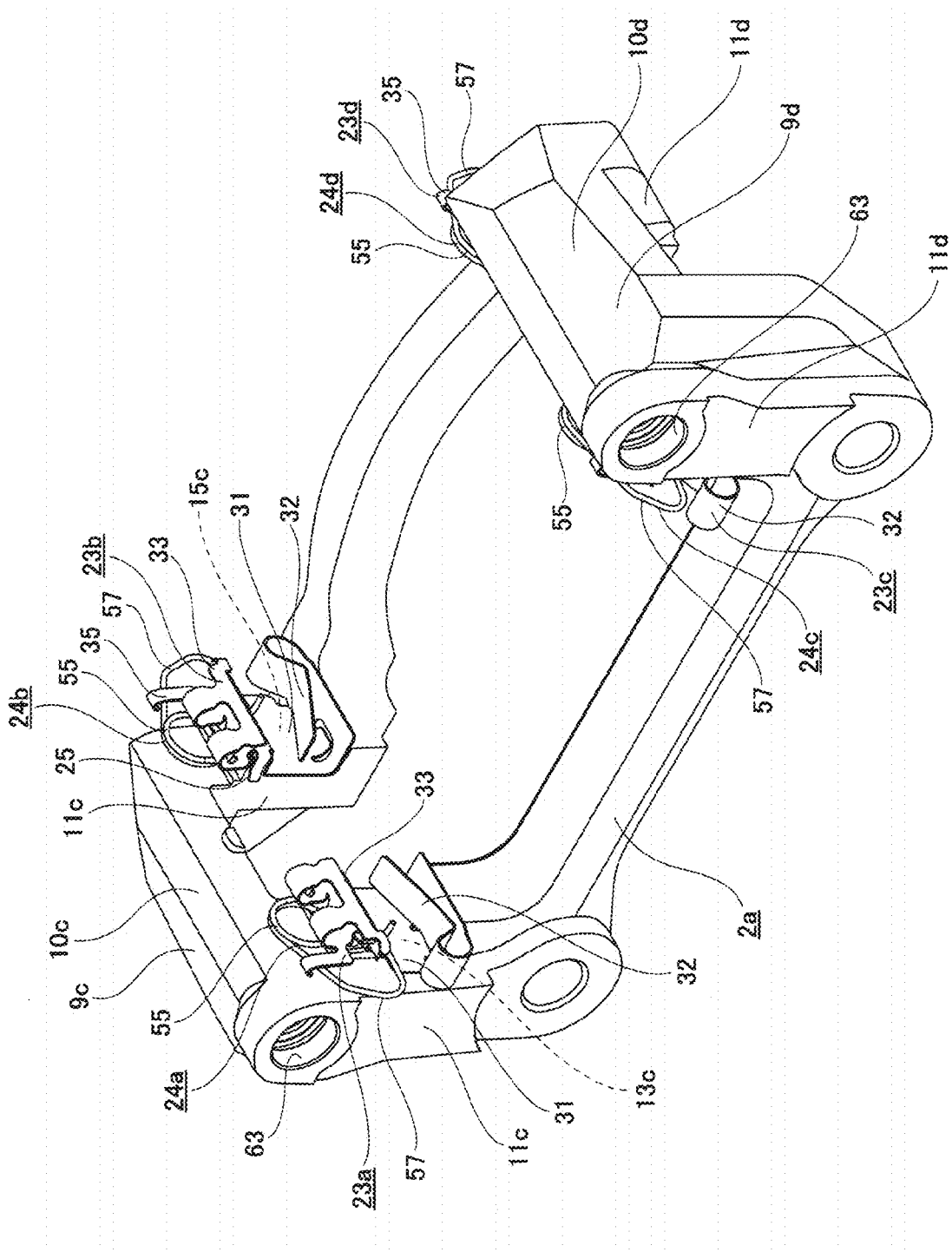
FIG. 5 is a view showing that inner and outer pads are omitted from FIG. 2.
Figure 6:
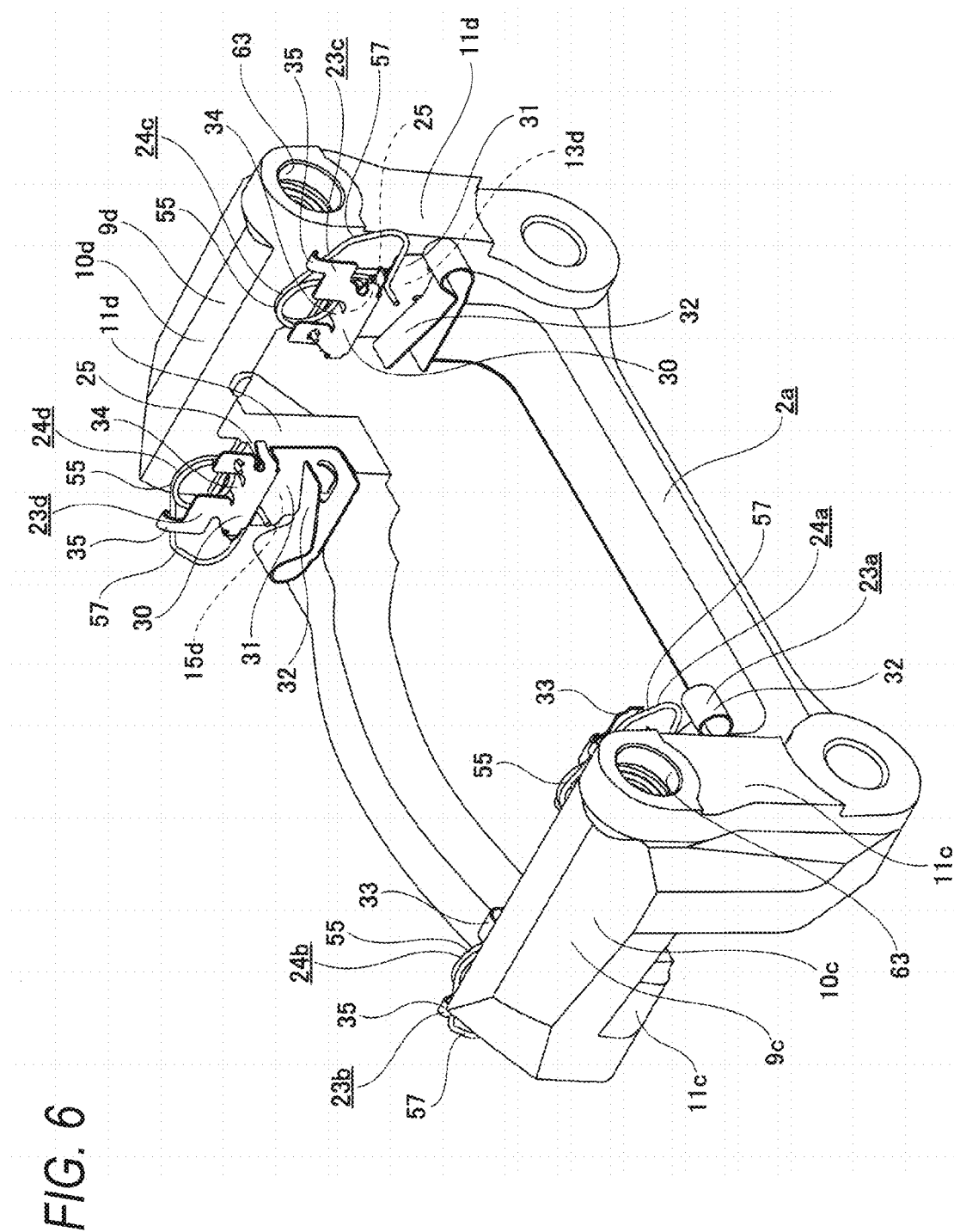
FIG. 6 is a view showing that the inner and outer pads are omitted from FIG. 3.

First, during breaking, an interior of the cylinder portion provided in the caliper (not shown) is pressurized, and the lining 26 of the inner pad 4*a* is pressed against the axial inner side surface of the rotor 8 from a lower side to the upper side in FIG. 4 by a piston. Accordingly, as a reaction of the pressing force, the caliper is displaced downward in FIG. 4 based on the sliding of the guide pin (not shown) and the guide hole 63 formed in the rotation-in side and rotation-out side support portions 9*c*, 9*d* of the support 2*a*, and a pawl portion provided at an axially outer side portion of the caliper press the lining 28 of the outer pad 5*a* against the axially outer surface of the rotor 8. As a result, the rotor 8 is strongly clamped from both axial sides thereof and the braking is performed. At this time, the abutting portions 61 configuring the return springs 24*a* to 24*d* are pushed by the axial side surfaces of the ear portions 12*a*, 14*a* provided on the inner and outer pads 4*a*, 5*a* so as to be displaced in the axial direction in a direction approaching the rotor 8. At the same time, the axial arms 60 configuring the return springs 24*a* to 24*d* are displaced in the axial direction. As a result, a deflection amount (the amount of elastic deformation of the coil portion 55) of the spring arms 57 configuring the return springs 24*a* to 24*d* is larger than that during non-braking.

When the braking is released, based on the elastic restoring forces of the return springs 24*a* to 24*d*, the abutting portions 61 are pressed against the axial side surfaces of the ear portions 12*a*, 14*a* of the inner and outer pads 4*a*, 5*a*, and apply elastic forces to the inner and outer pads 4*a*, 5*a* in a direction away from each other (a direction in which the inner and outer pads 4*a*, 5*a* are separated from the rotor 8). Therefore, the friction surfaces of the linings 26, 28 of the inner and outer pads 4*a*, 5*a* are separated from both axial side surfaces of the rotor 8.

In the floating type disc brake 1*a* of the present embodiment as described above, since the pad clips 23*a* to 23*d* which are separate from each other are used on the axially inner side and the axially outer side of the rotor 8, it is not necessary to design and manufacture a new pad clip according to a thickness dimension of the rotor 8. That is, regardless of the thickness dimension of the rotor 8, the same pad clips 23*a* to 23*d* can be used. Therefore, it is possible to reduce the manufacturing costs due to commonality of components.

Further, the return springs 24*a* to 24*d* can be held respectively in the pad clips 23*a* to 23*d* without impairing the function of the pad clips 23*a* to 23*d*.

That is, in the present embodiment, the tongue piece-shaped spring holding portion 34 is provided to extend outward in the circumferential direction from the outer side plate portion 36 configuring the clamping portion 30, and an circumferentially outer side portion of the spring holding portion 34 protrudes outward in the circumferential direction than the base portion of a pair of pressing arms 44 configuring the circumferential pressing portion 33. Further, the coil portions 55 configuring the return springs 24*a* to 24*d* are placed on the upper surfaces of the circumferentially outer side portions of the spring holding portions 34, and thus the return springs 24*a* to 24*d* are held on the back surface side (circumferentially outer side) of the pad clips 23*a* to 23*d* except a part thereof. Therefore, the return springs 24*a* to 24*d* held in this manner does not obstacle sliding contact between the inner and outer pads 4*a*, 5*a* and the pad clips 23*a*, 23*b*, and the pressing function of the radial pressing portion 32 and the circumferential pressing portion 33 can be prevented from being impaired.

The coil portions 55 configuring the return springs 24*a* to 24*d* are placed on the upper surfaces of the placing plate portions 47 such that central axes of the coil portions 55 are directed in the circumferential direction and stand against the back surface of the base portion (upright plate portion 54) of the pair of pressing arm portions 44, so that space for installing the coil portion 55 can be reduced in size. In particular, a dimension in the circumferential direction can be reduced. Further, since the tip end portions of the engaging arms 56 configuring the return springs 24*a*, 24*b* are engaged to the base portion of the pressing arms 44 in which bending deformation is barely generated, the function of the circumferential pressing portion 33 is not impaired due to the engagement of the engaging arm 56.

In a state where the return springs 24*a* to 24*d* are attached on the pad clips 23*a* to 23*d*, the coil portion 55 can be pressed inward in the radial direction with respect to the placing plate portion 47 of the spring holding portion 34, and the coil portion 55 can be clamped from both circumferential sides thereof by the base portion of the pair of pressing arms 44 and the locking piece 48. Therefore, the positioning of the coil portion 55 (the return springs 24*a* to 24*d*) in the radial direction and in the circumferential direction can be realized. The coil portion 55 can be prevented from being tilted in the circumferential direction. Further, since the tip end portion of the engaging arm 56 is engaged by the engaging portion 46, the positioning of the return springs 24*a* to 24*d* in the axial direction can be realized. Therefore, the return springs 24*a* to 24*d* can be effectively prevented from falling off from the pad clips 23*a* to 23*d*, and a desired returning force can be stably applied to the inner and outer pads 4*a*, 5*a* by the return springs 24*a* to 24*d*.

Since the pair of pressing arms 44 configuring the circumferential pressing portion 33 are arranged to be spaced apart from each other in the axial direction and the width dimensions thereof in the axial direction are equal to each other, the inner and outer pads 4*a*, 5*a* can be stably pressed in the circumferential direction even in a case where the abutting position between the circumferentially outer side surfaces of the inner and outer pads 4*a*, 5*a* and the pad abutting portion 45 is deviated in the axial direction as the wear of the linings 26, 28 of the inner and outer pads 4*a*, 5*a* progresses. Further, since the spring constants of the first pawl piece 39*a* and the second pawl piece 39*b* which clamp the projection portion 25 from both axial sides thereof are kept low, the projection portion 25 can be stably clamped even in a case where there is variation in the shape of the axial side surface of the projection portion 25.

Further, since the pad clips 23*a* to 23*d* and the return springs 24*a* to 24*d* can be handled integrally (assembly, subassembly) during assembling of the pad clips 23*a* to 23*d*, workability of the assembling is improved.

That is, as described above, since the elastic restoring forces of the return springs 24*a* to 24*d* are supported by the pad clips 23*a* to 23*d*, the return springs 24*a* to 24*d* can be supported with respect to the pad clips 23*a* to 23*d* with sufficient force. Thus, the pad clips 23*a* to 23*d* and the return springs 24*a* to 24*d* can be handled as a single unit and the pad clips 23*a* to 23*d* and the return springs 24*a* to 24*d* can be assembled at the same time. Therefore, ease of assembly can be improved and assembly costs can be reduced. Moreover, since the attaching of the return springs 24*a* to 24*d* to the pad clips 23a to 23d can be performed in a wide space where the space is not limited, the operation can be easily performed.

Since the pad clips 23a to 23d and the return springs 24a to 24d can be handled as a single unit, management costs of parts can also be reduced. Further, the attaching of the return springs 24a to 24d to the pad clips 23a to 23d is performed in advance at the supplier of the parts, and an assembly of the pad clips 23a to 23d and the return springs 24a to 24d can also be loaded to the factory for assembling the disk brake. In this case, management (delivery management, management of boxes, number management, inventory management, order management, storage location) in the factory for assembling the disc brake and the like is about half of the case where the pad clips 23a to 23d and the return springs 24a to 24d are handled as separate units. Further, the number of setup steps can be reduced, it can be prevented to assemble wrongly, and the number of assembling steps can also be reduced.

During implementing of the present invention, for example, a wire diameter of the return spring on the axially outer side can be larger than a wire diameter of the return spring on the axially inner side. Therefore, the elastic force applied to the outer pad where wear occurs easily can be larger than the elastic force applied to the inner pad. Further, in addition to the difference in wire diameter between the return spring on the axially inner side and the return spring on the axially outer side, shapes in a free state, number of turns of the coil portion, etc. can be different, and thus the elastic force applied to the outer pad can be different from the elastic force applied to the inner pad.

In the description of the embodiment, after the return spring was attached to the pad clip (after the assembly in the attached state is configured), an example of an assembling method in which the pad clip and the return spring are assembled to the support at the same time has been described as an example. However, when implementing the present invention, after the single pad clip is assembled to the support, an assembling method for assembling the return spring to the pad clip can also be implemented.

When implementing the present invention, a recessed groove can also be formed on a side surface of the ear portion configuring the pad, and the abutting portion configuring the return spring can be accommodated inside the recessed groove. According to such a configuration, even in a case where the amount of wear of the lining increases (until completely worn out), the abutting portion and the axial side surface of the rotor can be prevented from rubbing against each other. Further, the pad clip can also be used as a single unit without attaching a return spring thereto.

According to the present invention with the above-described configuration, it is possible to realize a structure capable of holding a return spring without impairing the function of pad clips even in a case where the pad clips which are separated from each other are used on the axially inner side and the axially outer side of the rotor.

The invention claimed is:

1. A pad clip for a disc brake, comprising:
a clamping portion which has a substantially U-shaped cross section and is configured to elastically clamp a projection portion provided on a circumferentially inner side surface of a pad guide portion of a support from both sides thereof in a radial direction of a rotor;
a radial pressing portion which is disposed inward from the clamping portion in the radial direction, and the radial pressing portion is configured to press outward in the radial direction on an ear portion provided on a circumferentially outer side portion of the pad;
a circumferential pressing portion which extends outward in the radial direction from a radially outer side portion of the clamping portion, an intermediate portion thereof being folded back inward in a circumferential direction of the rotor and being folded back inward in the radial direction, and a tip end portion thereof being configured to press the pad inward in the circumferential direction at a vicinity of the clamping portion in the radial direction; and
a spring holding portion including a placing plate portion and a locking piece, the spring holding portion protrudes outward in the circumferential direction from the radially outer side portion of the clamping portion from a base portion of the circumferential pressing portion, and is configured to hold a return spring which presses the pad away from the rotor in the axial direction of the rotor, the placing plate portion extends outward in the circumferential direction from the radially outer side plate portion, and the locking piece is bent outward in the radial direction from an circumferentially outer side portion of the placing plate portion,
wherein the clamping portion includes a pawl piece which is bent outward in the circumferential direction on an axial end portion of the clamping portion so as to elastically press the projection portion from an axial side thereof.

2. The pad clip according to claim 1, wherein an engaging portion configured to engage an end portion of the return spring is provided in the base portion of the circumferential pressing portion.

3. The pad clip according to claim 2, wherein the engaging portion is a through hole or a cutout.

4. The pad clip according to claim 2, wherein the engaging portion is a triangular through hole.

5. The pad clip according to claim 1, wherein a restraining portion which is configured to support an elastic force of the return spring in a state before the pad is assembled and to restrain the return spring with respect to the pad clip, is provided outward in the radial direction from the clamping portion and on an axial side of the base portion of the circumferential pressing portion.

6. The pad clip according to claim 1, wherein the circumferential pressing portion includes a pair of pressing arms and a pad abutting portion,
the pressing arms extend from a base end portion of the circumferential pressing portion to the intermediate portion of the circumferential pressing portion,
each of the pressing arms has an inverted U-shape,
the pressing arms are spaced apart from each other in the axial direction of the rotor, and
the pad abutting portion is provided at the tip end portion of the circumferential pressing portion and connects the pair of pressing arms to each other in the axial direction.

7. The pad clip according to claim 6, wherein width dimensions of the pair of pressing arms in the axial direction are the same.

8. The pad clip according to claim 1, further comprising:
a plate-shaped guide plate portion which extends inward in the radial direction from a radially inner side portion of the clamping portion and is configured to be arranged between a tip end surface of the ear portion and the circumferentially inner side surface of the pad guide portion, wherein the guide plate portion is positioned outward in the circumferential direction from the base portion of the circumferential pressing portion.

9. The pad clip according to claim 1, wherein the radial pressing portion includes a transverse V shape that extends in an axial direction of the rotor.

10. An assembly of a pad clip and a return spring, comprising:
    the pad clip according to claim 1; and
    a return spring made of wire material,
    wherein a part of the return spring is held by the spring holding portion, and the return spring is held on the pad clip in a state of being arranged outward in the circumferential direction from the base portion of the circumferential pressing portion.

11. The assembly of the pad clip and the return spring according to claim 10, wherein
    the return spring includes a coil portion, and
    the coil portion is held on the spring holding portion in a state where a central axis of the coil portion is oriented in the circumferential direction.

12. The assembly of the pad clip and the return spring according to claim 10, wherein
    the return spring includes a spring arm which is arranged between the clamping portion and the radial pressing portion in the radial direction and extends toward the rotor in the axial direction, and
    a tip end portion of the spring arm is bent inward in the circumferential direction.

13. The assembly of the pad clip and the return spring according to claim 10, wherein
    an engaging portion which is a triangular through hole is provided in the base portion of the circumferential pressing portion, and
    an end portion of the return spring is pressed to an opening edge of the engaging portion based on an elastic restoring force of the return spring.

14. A floating disc brake, comprising:
    a support which is fixed to a vehicle body so as to be adjacent to a rotor rotating together with a vehicle wheel;
    a pair of pads which is supported to be movable in an axial direction of the rotor with respect to the support in a state of being arranged on both axial sides of the rotor;
    a caliper which is supported to be movable in the axial direction with respect to the support;
    pad clips which are respectively provided between a circumferentially inner side surface of a pad guide portion of a circumferentially outer side portion of the support and a circumferentially outer side portion of each pad, the pad guide portion being arranged on an axial side of the rotor; and
    return springs which are respectively held on each of the pad clips and configured to press each pad away from the rotor in an axial direction of the rotor,
    wherein at least one pair of the pad clip and the return spring is the assembly of the pad clip and the return spring according to claim 10.

* * * * *